(12) United States Patent
Kitazawa

(10) Patent No.: US 12,743,192 B2
(45) Date of Patent: Sep. 22, 2026

(54) INFORMATION PROCESSING SYSTEM, NON-TRANSITORY COMPUTER READABLE MEDIUM STORING PROGRAM, AND INFORMATION PROCESSING METHOD FOR DISPLAYING LINK OBJECT ASSOCIATED WITH FILE STORED IN STORAGE REGION

(71) Applicant: FUJIFILM Business Innovation Corp., Tokyo (JP)

(72) Inventor: Yuka Kitazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/359,886

(22) Filed: Jul. 27, 2023

(65) Prior Publication Data

US 2024/0272772 A1 Aug. 15, 2024

(30) Foreign Application Priority Data

Feb. 15, 2023 (JP) ................................ 2023-021387

(51) Int. Cl.
*G06F 3/0483* (2013.01)
*G06F 3/0484* (2022.01)
*G06F 40/134* (2020.01)

(52) U.S. Cl.
CPC .......... *G06F 3/0483* (2013.01); *G06F 3/0484* (2013.01); *G06F 40/134* (2020.01); *G06F 2203/04803* (2013.01)

(58) Field of Classification Search
CPC .... G06F 16/957; G06F 16/168; G06F 40/134; G06F 2203/04803
IPC .............. G06F 16/957,16/168, 40/134, 3/0483, 3/0484, 2203/04803
See application file for complete search history.

(56) References Cited

U.S. PATENT DOCUMENTS 5,625,781 A * 4/1997 Cline .................. G06F 16/9558 709/227
7,181,681 B2 * 2/2007 Kundu .................. G06F 16/958 709/219

(Continued)

FOREIGN PATENT DOCUMENTS

| EP | 3709245 | 9/2020 |
|---|---|---|
| JP | 2005258862 | 9/2005 |
| WO | 2005106710 | 11/2005 |

OTHER PUBLICATIONS

Anonymous, "ownCloud User Manual", The ownCloud Team, May 4, 2020, pp. 1-69.

(Continued)

*Primary Examiner* — Patrick F Riegler
(74) *Attorney, Agent, or Firm* — JCIPRNET

(57) ABSTRACT

An information processing system includes one or a plurality of processors configured to, in a case where a predetermined operation is performed on a link object associated with a file present on a network, store the file and specification information for specifying the file in a predetermined storage region in association with each other, and perform a control of displaying the link object associated with the file stored in the storage region in an identifiable aspect from other link objects in a case where a plurality of objects including the link object are displayed on a web page.

17 Claims, 17 Drawing Sheets

(56) References Cited

U.S. PATENT DOCUMENTS 7,596,766 B1 * 9/2009 Sharma ................. G06F 3/0481 715/713
7,975,238 B2 * 7/2011 Keohane ............. G06F 16/9562 715/745
8,433,995 B1 * 4/2013 Karam ................ G06F 16/9562 715/208
8,769,425 B2 * 7/2014 Wang .................... G06F 16/168 715/771
9,384,290 B1 * 7/2016 Liu ..................... G06F 16/9537
10,007,729 B1 * 6/2018 Reed ..................... G06F 16/951
10,606,924 B2 * 3/2020 Jain ....................... G06F 16/168
11,061,553 B1 * 7/2021 Villars .................. G06F 3/0486
11,314,928 B1 4/2022 Thomas
11,797,752 B1 * 10/2023 Xu .......................... G06F 9/451
11,922,712 B2 * 3/2024 Tsibulevskiy ........... G06F 18/40
2002/0129164 A1 * 9/2002 Van Der Meulen .. H04L 69/329 709/239
2003/0128233 A1 * 7/2003 Kasriel ................. G06F 16/955 707/E17.112
2004/0254913 A1 * 12/2004 Bernstein ............ G06F 16/9574
2005/0193090 A1 * 9/2005 Ingram ................. G06F 16/957 709/217
2006/0242121 A1 * 10/2006 DeVorchik ............ G06F 16/168
2007/0136657 A1 * 6/2007 Blumenthal .......... G06F 16/957 715/201
2008/0148190 A1 * 6/2008 Schaff ................... G06F 3/0482 715/853
2008/0301280 A1 * 12/2008 Chasen ................... H04L 67/02 709/224
2009/0276719 A1 * 11/2009 Pardehpoosh ......... G06Q 30/02 715/762
2010/0211565 A1 * 8/2010 Lotito ................... G06F 16/438 707/723
2010/0229113 A1 * 9/2010 Conner .................. G06Q 10/10 715/771
2011/0289394 A1 * 11/2011 Roh .................... G06F 16/9562 715/205
2012/0011588 A1 * 1/2012 Milener .............. H04L 63/1408 726/22
2012/0323898 A1 * 12/2012 Kumar ............... G06Q 30/0251 707/723
2013/0132868 A1 * 5/2013 Hackett ................. G06F 16/958 715/760
2013/0174020 A1 * 7/2013 Martin .................. G06F 16/986 715/234
2014/0164893 A1 * 6/2014 Pariente ................ G06F 3/0482 715/207
2014/0173523 A1 * 6/2014 Scherpa .............. G06F 3/04842 715/854
2014/0282118 A1 * 9/2014 Kumamoto ........... G06F 3/0481 715/760
2015/0193108 A1 * 7/2015 Li ......................... G06F 40/131 715/748
2015/0379618 A1 * 12/2015 Neumann .......... G06Q 30/0639 705/26.61
2016/0048485 A1 * 2/2016 Sherwood ........... G06F 16/9574 715/234
2018/0143947 A1 * 5/2018 Jain ....................... G06F 16/168
2020/0202066 A1 * 6/2020 Bodera ................. G06F 40/134
2020/0304863 A1 * 9/2020 Domm .................... H04L 67/55
2022/0179932 A1 * 6/2022 Lavery ..................... G06N 3/08
2023/0305730 A1 * 9/2023 Yeung ................... G06F 3/0482
2024/0111411 A1 * 4/2024 Kittur ................... G06F 3/0486
2024/0320289 A1 * 9/2024 Kurebayashi ......... G06F 40/134
2024/0403366 A1 * 12/2024 Mancuso .............. G06F 16/288

OTHER PUBLICATIONS

"Search Report of Europe Counterpart Application", issued on Jun. 11, 2024, p. 1-p. 14.

* cited by examiner

XXXXX www.xxxxx.xxx 100 501 511 51 600 41 42 43 601 61 24 202 22 25 23 21 201

22
24
XXXXX
WWW.XXXXX.XXX
100
STORAGE HISTORY INFORMATION
MAXIMUM 100 ITEMS OF LATEST HISTORY ARE DISPLAYED.
○INPUT ●REMOVAL
OPERATION DATE AND TIME
TYPE
FILE NAME
OPERATOR
SENTENCE HISTORY
28/09/2022 11:33
PDF
OOO
OOOO
HISTORY
CLOSE
501
900
711
721
41
42
43
21
203
23
600
25
63

XXXXX
WWW.XXXXX.XXX
100
501
41
42
43
51
55
800
54
514
700
55
51
513
800
204
24
22
700
25
201
23
700
21
201

Figure 16:
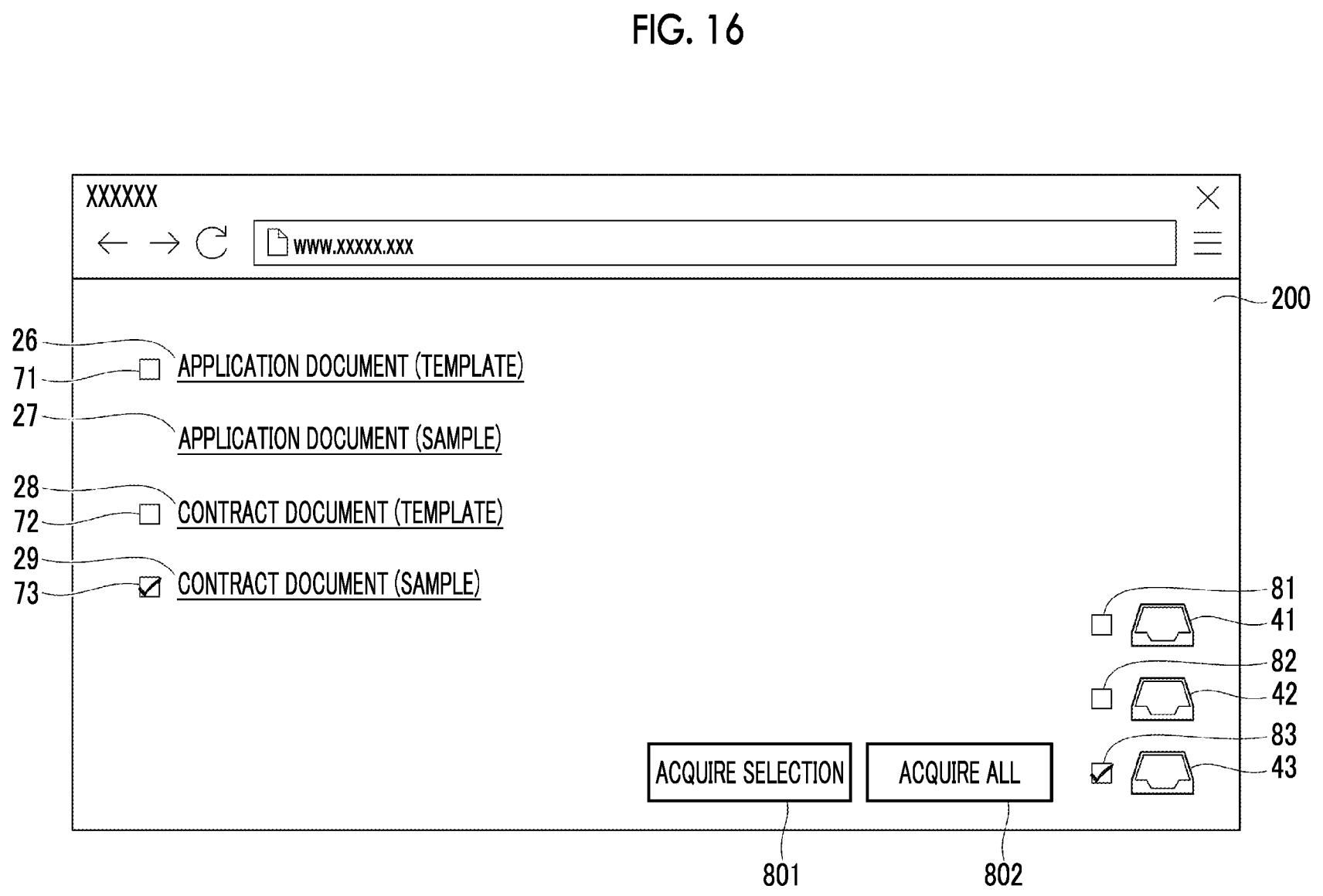

XXXXX

WWW.XXXXX.XXX

APPLICATION DOCUMENT (TEMPLATE)

APPLICATION DOCUMENT (SAMPLE)

CONTRACT DOCUMENT (TEMPLATE)

CONTRACT DOCUMENT (SAMPLE)

ACQUIRE SELECTION

ACQUIRE ALL 26 71 27 28 72 29 73

81 41 82 42 83 43

801 802

INFORMATION PROCESSING SYSTEM, NON-TRANSITORY COMPUTER READABLE MEDIUM STORING PROGRAM, AND INFORMATION PROCESSING METHOD FOR DISPLAYING LINK OBJECT ASSOCIATED WITH FILE STORED IN STORAGE REGION

CROSS-REFERENCE TO RELATED APPLICATIONS

This application is based on and claims priority under 35 USC 119 from Japanese Patent Application No. 2023-021387 filed Feb. 15, 2023.

BACKGROUND

(i) Technical Field

The present invention relates to an information processing system, a non-transitory computer readable medium storing program, and an information processing method.

(ii) Related Art

A technology for determining whether or not an identical file is present in a terminal apparatus of a storage destination in storing a file on a network in the terminal apparatus has been known (for example, JP2005-258862A). In such a technology, in a case where an operation for storing the file on the network in the terminal apparatus is performed, determination as to whether or not the identical file is present in the terminal apparatus is performed.

SUMMARY

On the other hand, users have demanded that a file that has already been stored among files present on the network can be determined as being already stored without further performing the operation for storage.

An object of the present invention is to enable a file that has already been stored among files present on a network to be determined as being already stored without further performing an operation for storage.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including one or a plurality of processors configured to, in a case where a predetermined operation is performed on a link object associated with a file present on a network, store the file and specification information for specifying the file in a predetermined storage region in association with each other, and perform a control of displaying the link object associated with the file stored in the storage region in an identifiable aspect from other link objects in a case where a plurality of objects including the link object are displayed on a web page.

BRIEF DESCRIPTION OF THE DRAWINGS

Exemplary embodiment(s) of the present invention will be described in detail based on the following figures, wherein:

FIG. 8 is a diagram illustrating a specific example of the website displayed on the user terminal;

FIG. 10 is a diagram illustrating a specific example of the website displayed on the user terminal different from the examples in FIGS. 7 and 8;

FIG. 12 is a diagram illustrating a specific example of the website displayed on the user terminal different from the examples in FIG. 7 to FIG. 11;

FIG. 13 is a diagram illustrating a specific example of the website displayed on the user terminal different from the examples in FIG. 7 to FIG. 12;

FIG. 14 is a diagram illustrating a specific example of the website displayed on the user terminal different from the examples in FIG. 7 to FIG. 12;

FIG. 16 is a diagram illustrating a specific example of the website displayed on the user terminal different from the examples in FIG. 7 to FIG. 15.

DETAILED DESCRIPTION

Hereinafter, an exemplary embodiment of the present invention will be described in detail with reference to the accompanying drawings.

Overall Configuration of Information Processing System

Figure 1:
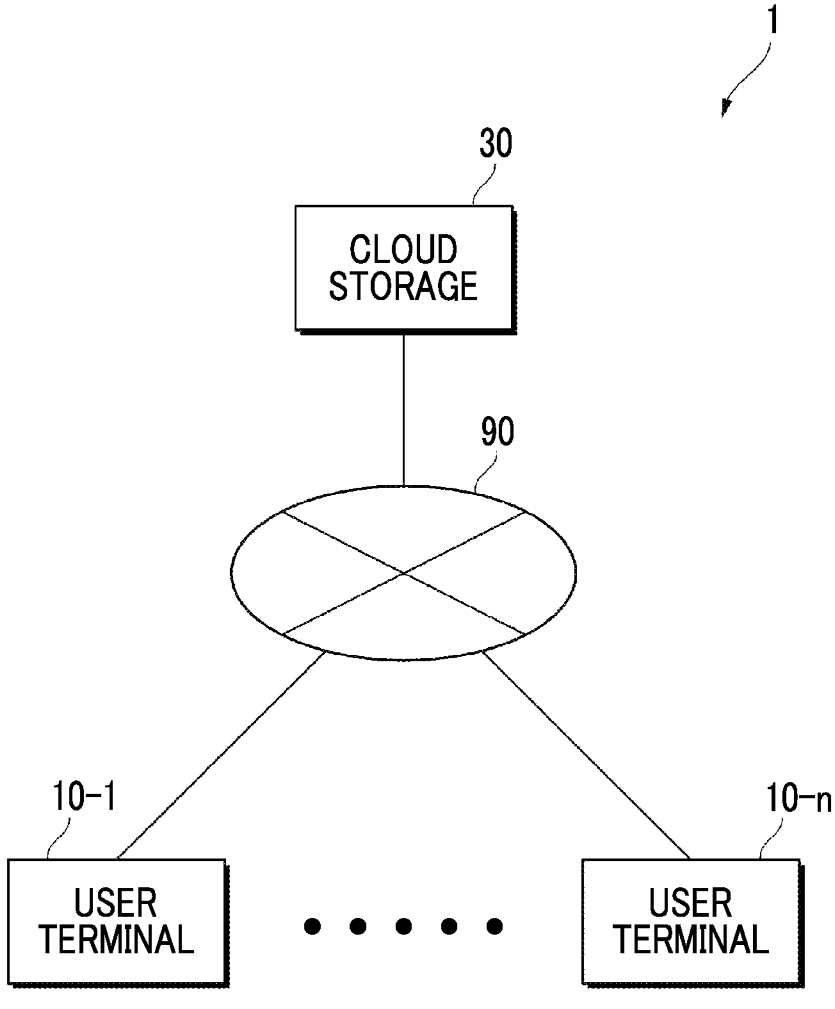
FIG. 1 is a diagram illustrating an example of an overall configuration of an information processing system to which the present exemplary embodiment is applied.

FIG. 1 is a diagram illustrating an example of an overall configuration of an information processing system 1 to which the present exemplary embodiment is applied.

The information processing system 1 is configured by connecting user terminals 10-1 to **10-*n* (n is an integer value greater than or equal to 1) to a cloud storage 30 via a network 90. The network 90** is, for example, a local area network (LAN) or the Internet.

User Terminal

Each of the user terminals 10-1 to **10-*n* is an information processing apparatus such as a personal computer, a tablet terminal, or a smartphone operated by the user who uses the information processing system 1. An assumption that application software with which various types of processing in the present exemplary embodiment can be executed is installed in advance on each of the user terminals 10-1 to 10-*n*** as an extension function of a browser is made.

Each of the user terminals 10-1 to **10-*n* transmits various types of information toward the cloud storage 30. In addition, each of the user terminals 10-1 to 10-*n* acquires various types of information by downloading from the cloud storage 30 and performs various types of processing. Hereinafter, the user terminals 10-1 to 10-*n* will be collectively referred to as a "user terminal 10**" unless necessary to be individually described.

For example, the user terminal 10 accesses a web page including a link object and displays the web page based on an operation of the user. The "link object" means an image or text object associated with a file. In addition, the user terminal 10 receives an operation for storing a link destination file as a predetermined operation with respect to the link object displayed on the web page of the access destination. Here, the "link destination file" is, for example, an image (still image and video) file, a text file, or an HTML file.

In a case where the operation for storing the link destination file is received, the user terminal 10 acquires the link destination file by downloading and uploads the link destination file to the cloud storage 30. The cloud storage 30 is provided with one or more storage regions as a storage destination of the uploaded link destination file.

The link destination file uploaded to the cloud storage 30 is stored in a storage region designated in advance in association with information (hereinafter, referred to as "link destination specification information") for specifying the link destination file. The link destination specification information includes, for example, a uniform resource locator (URL) specified from source code of the web page displayed on the user terminal 10 and information related to disposition of the link object on the web page.

The user terminal 10 displays the link object of which the associated link destination file is stored in the storage region of the cloud storage 30 among link objects displayed on the web page of the access destination, in an identifiable aspect from other link objects. Details of the configuration and processing of the user terminal 10 will be described in detail later.

Cloud Storage

The cloud storage 30 constituting the information processing system 1 is a storage region provided on the network 90 as the storage destination of the link destination file and has one or more storage regions as described above. The link destination file uploaded to the cloud storage 30 from the user terminal 10 is stored in one storage region designated by the user from among the one or more storage regions. The one storage region as the storage destination of the link destination file is designated by, for example, an operation with respect to the user terminal 10.

The above configuration of the information processing system 1 is merely an example, and the information processing system 1 as a whole may have functions that realize the above processing. Thus, all or a part of the functions realizing the above processing may be shared or used in cooperation with each other in the information processing system 1. For example, all or a part of functions of the cloud storage 30 may be provided as functions of the user terminal 10. In addition, all or a part of the functions of each of the cloud storage 30 and the user terminal 10 constituting the information processing system 1 may be handed over to another server or the like, not illustrated, to perform all or a part of the above processing. Accordingly, the processing of the information processing system 1 as a whole may be accelerated, and the processing may also be complemented.

Hardware Configuration of User Terminal

Figure 2:
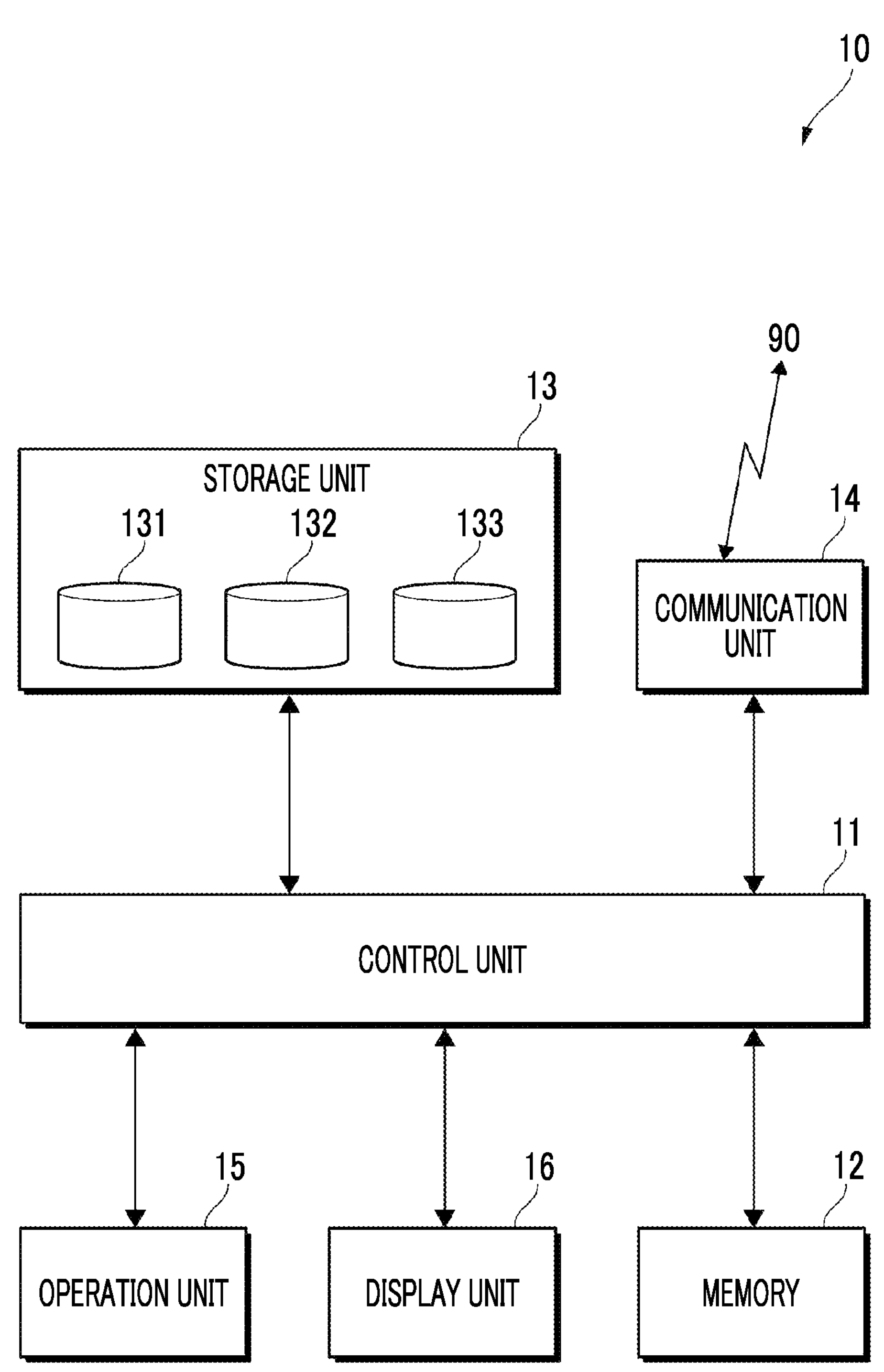
FIG. 2 is a diagram illustrating an example of a hardware configuration of a user terminal.

FIG. 2 is a diagram illustrating an example of a hardware configuration of the user terminal 10.

The user terminal 10 includes a control unit 11, a memory 12, a storage unit 13, a communication unit 14, an operation unit 15, and a display unit 16. Each of these units is connected via a data bus, an address bus, a peripheral component interconnect (PCI) bus, or the like.

The control unit 11 is a processor that controls the functions of the user terminal 10 by executing various types of software such as an OS (basic software) and application software (software applications). The control unit 11 is configured with, for example, a central processing unit (CPU). The memory 12 is a storage region in which various types of software and data and the like used for executing the software are stored, and is used as a work area in operations. The memory 12 is configured with, for example, a random access memory (RAM).

The storage unit 13 is a storage region in which input data for various types of software, output data from various types of software, and the like are stored. The storage unit 13 is configured with, for example, a hard disk drive (HDD), a solid state drive (SSD), or a semiconductor memory used for storing programs, various types of setting data, and the like. Databases that store various types of information are stored in the storage unit 13. For example, databases such as a file DB 131 in which the downloaded link destination file is stored, a specification information DB 132 in which the link destination specification information is stored, and an operation history DB 133 in which information (hereinafter, referred to as "operation history information") related to a history of operation of the user is stored are stored in the storage unit 13.

The communication unit 14 transmits and receives data to and from the cloud storage 30 and an outside via the network 90. The operation unit 15 is configured with, for example, a keyboard, a mouse, a mechanical button, or a switch and receives an input operation. The operation unit 15 may include a touch sensor that is integrated with the display unit 16 to constitute a touch panel. The display unit 16 is configured with, for example, a liquid crystal display or an organic electro luminescence (EL) display used for displaying information and displays image (video and still image) data, text data, and the like.

Functional Configuration of Control Unit of User Terminal

Figure 3:
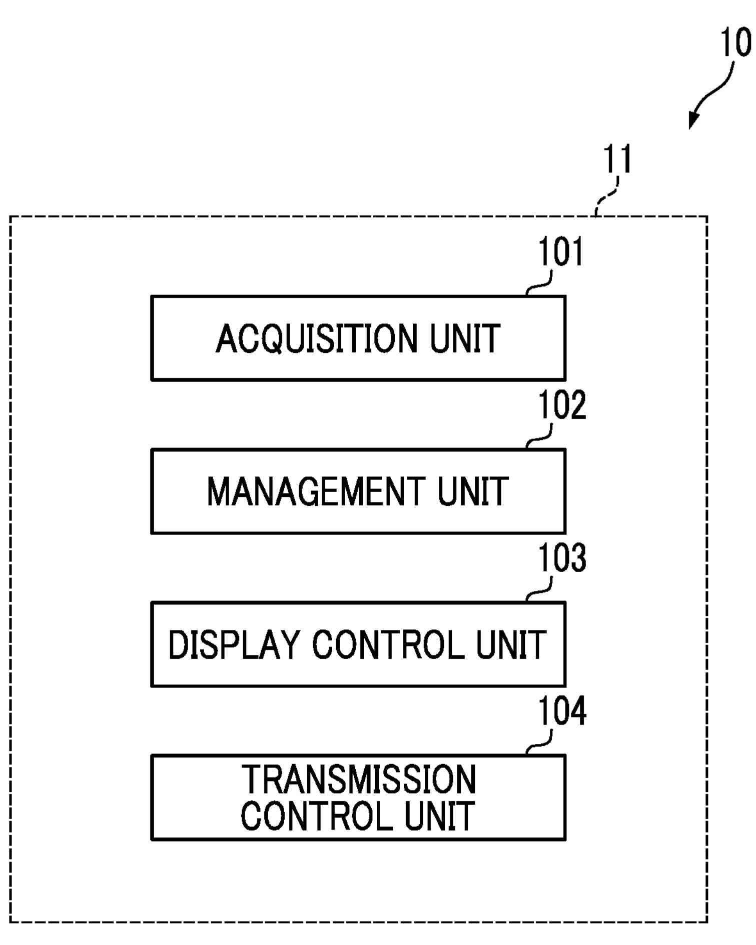
FIG. 3 is a diagram illustrating an example of a functional configuration of a control unit of the user terminal.

FIG. 3 is a diagram illustrating an example of a functional configuration of the control unit 11 of the user terminal 10.

An acquisition unit 101, a management unit 102, a display control unit 103, and a transmission control unit 104 function in the control unit 11 of the user terminal 10.

The acquisition unit 101 acquires various types of information. For example, the acquisition unit 101 acquires information transmitted from each of the cloud storage 30 and the outside. Specifically, the acquisition unit 101 acquires the link destination specification information downloaded from the cloud storage 30. In addition, the acquisition unit 101 acquires the link destination file transmitted from the outside. Specifically, in a case where the operation for storing the link destination file is performed as an operation with respect to the link object, the acquisition unit 101 accesses a provider of the link destination file and acquires the link destination file. More specifically, the acquisition unit 101 accesses the external server or the like that is the provider of the link destination file, and acquires the link destination file by downloading from the external server or the like.

In a case where an operation of bringing the link object into contact with or close to an object (hereinafter, referred to as a "storage region object") that is associated with each of the one or more storage regions of the cloud storage 30 and that is displayed on the display unit 16 is performed as the operation for storing the link destination file, the acquisition unit 101 performs the following processing. That is, the acquisition unit 101 accesses the external server or the like in which the link destination file is stored, and acquires the link destination file transmitted from the external server or the like. Here, the "operation of bringing into contact with or close to" is, for example, an operation of dragging and dropping the link object onto the storage region object displayed on the display unit 16.

The management unit 102 stores and manages the link destination file acquired by the acquisition unit 101 and the link destination specification information of the link destination file in the storage region of the cloud storage 30 in association with each other. Specifically, the management unit 102 stores and manages the link destination file acquired by the acquisition unit 101 in the file DB 131 of the storage unit 13 and stores and manages the link destination file in the storage region of the cloud storage 30.

In addition, the management unit 102 stores and manages the link destination specification information of the link destination file acquired by the acquisition unit 101 in the specification information DB 132 and stores and manages the link destination specification information in the storage region of the cloud storage 30. Specifically, the management unit 102 manages the link destination specification information in association with the link destination file stored in the storage region of the cloud storage 30. In addition, the management unit 102 stores and manages the operation history information in the operation history DB 133.

The display control unit 103 performs a control of displaying various types of information on the display unit 16 (refer to FIG. 2). For example, the display control unit 103 performs a control of displaying the link object of which the link destination file is stored in the storage region among the link objects displayed on the web page of the access destination, in the identifiable aspect from other link objects. Here, the "identifiable aspect" is, for example, display in a highlighted manner. Specific examples of the link object displayed on the web page in the identifiable aspect from other link objects will be described later with reference to FIG. 7 and the like.

In addition, the display control unit 103 performs a control of displaying the storage region object associated with each of the one or more storage regions of the cloud storage 30 in a superimposed manner on the web page of the access destination. Specific examples of the storage region object displayed in a superimposed manner on the web page of the access destination will be described later with reference to FIG. 7 and the like.

In addition, in a case where an operation (for example, a mouse-over or click operation) of selecting the link object of which the link destination file is stored in the storage region from among the link objects displayed on the web page is performed, the display control unit 103 performs the following control. That is, the display control unit 103 performs a control of displaying the storage region object associated with the storage region in which the link destination file is stored, in a superimposed manner on the web page in an identifiable aspect from other storage region objects. Here, the "identifiable aspect" is, for example, display in a highlighted manner. Specific examples of the storage region object displayed in a superimposed manner on the web page in the identifiable aspect from other storage region objects will be described later with reference to FIG. 8 and the like.

In addition, in a case where the operation of selecting the link object of which the link destination file is stored in the storage region from among the link objects displayed on the web page of the access destination is performed, the display control unit 103 performs a control of displaying at least a part of the link destination file associated with the link object in a superimposed manner on the storage region object associated with the storage region in which the link destination file is stored.

In this case, for example, a thumbnail image of the link destination file may be displayed in a superimposed manner on the storage region object. In addition, for example, in a case where the link destination file consists of a plurality of pages, only a top page may be displayed in a superimposed manner on the storage region object. Among these display aspects, in a case where the thumbnail image of the link destination file is displayed in a superimposed manner on the storage region object, an operation with respect to the thumbnail image of the link destination file may be received as an operation with respect to the link destination file. Here, the "operation with respect to the link destination file" is, for example, an operation of changing a file name of the link destination file, an operation of bundling a plurality of link destination files, or an operation of attaching a tag to the link destination file. Specific examples of the thumbnail image of the link destination file displayed in a superimposed manner on the storage region object will be described later with reference to FIG. 10 and the like.

In addition, in a case where the operation with respect to the thumbnail image of the link destination file is performed, the display control unit 103 performs a control of displaying the link object associated with the link destination file on the web page in an identifiable aspect from other link objects. Here, the "identifiable aspect" is, for example, display in a highlighted manner.

In addition, in a case where an operation of combining a plurality of link destination files stored in the storage region is performed as the operation with respect to the thumbnail image of the link destination file, the display control unit 103 performs a control of displaying a thumbnail image indicating that the operation is performed, in an identifiable aspect from other thumbnail images. Here, the "combining operation" means an operation of bundling a plurality of files in one storage region. In addition, the "identifiable aspect" is, for example, display in a highlighted manner. Specific examples of the thumbnail image that indicates that the operation of combining the plurality of link destination files is performed and that is displayed in the identifiable aspect from other thumbnail images will be described later with reference to FIG. 12 and the like.

In addition, in a case where an operation of selecting one storage region object from among one or more storage region objects displayed in a superimposed manner on the web page of the access destination is performed, the display control unit 103 performs a control of displaying information (hereinafter, referred to as "storage history information") indicating a storage history of the link destination file in the storage region associated with the storage region object, in a superimposed manner on the storage region object. A specific example of the storage history information displayed in a superimposed manner on the storage region object will be described later with reference to FIG. 11.

In addition, in a case where an operation of selecting one storage history information from one or more storage history information displayed in a superimposed manner on the storage region object is performed, the display control unit 103 performs a control of displaying the link object associated with the link destination file corresponding to the storage history information on the web page in an identifiable aspect from other link objects. Here, the "identifiable aspect" is, for example, display in a highlighted manner.

In addition, in a case where the link destination file stored in the storage region of the cloud storage 30 is moved to another non-accessible storage region, the display control unit 103 performs a control of displaying the storage history information of the link destination file in a superimposed manner on the storage region object.

In addition, the display control unit 103 performs a control of displaying the storage region object associated with the storage region of the cloud storage 30 that is the storage destination of the link destination file, in a superimposed manner on the web page in an identifiable aspect from other storage region objects. Here, the "identifiable aspect" is, for example, display in a highlighted manner.

In addition, in a case where a predetermined operation is performed on the storage region object, the display control unit 103 performs a control of starting application software in a display region different from a display region in which the web page of the access destination is displayed, to display content of the storage region associated with the storage region object. Here, the "predetermined operation" is, for example, a double-click operation. In addition, the "display region" is, for example, a screen displayed by an operation of switching between tabs.

The transmission control unit 104 performs a control of transmitting various types of information. Specifically, the transmission control unit 104 performs a control of transmitting various types of information toward each of the cloud storage 30 and the outside. Examples of the information transmitted toward the cloud storage 30 in the information transmitted by the control of the transmission control unit 104 include the downloaded link destination file and the link destination specification information.

Flow of Processing of User Terminal

Figure 4:
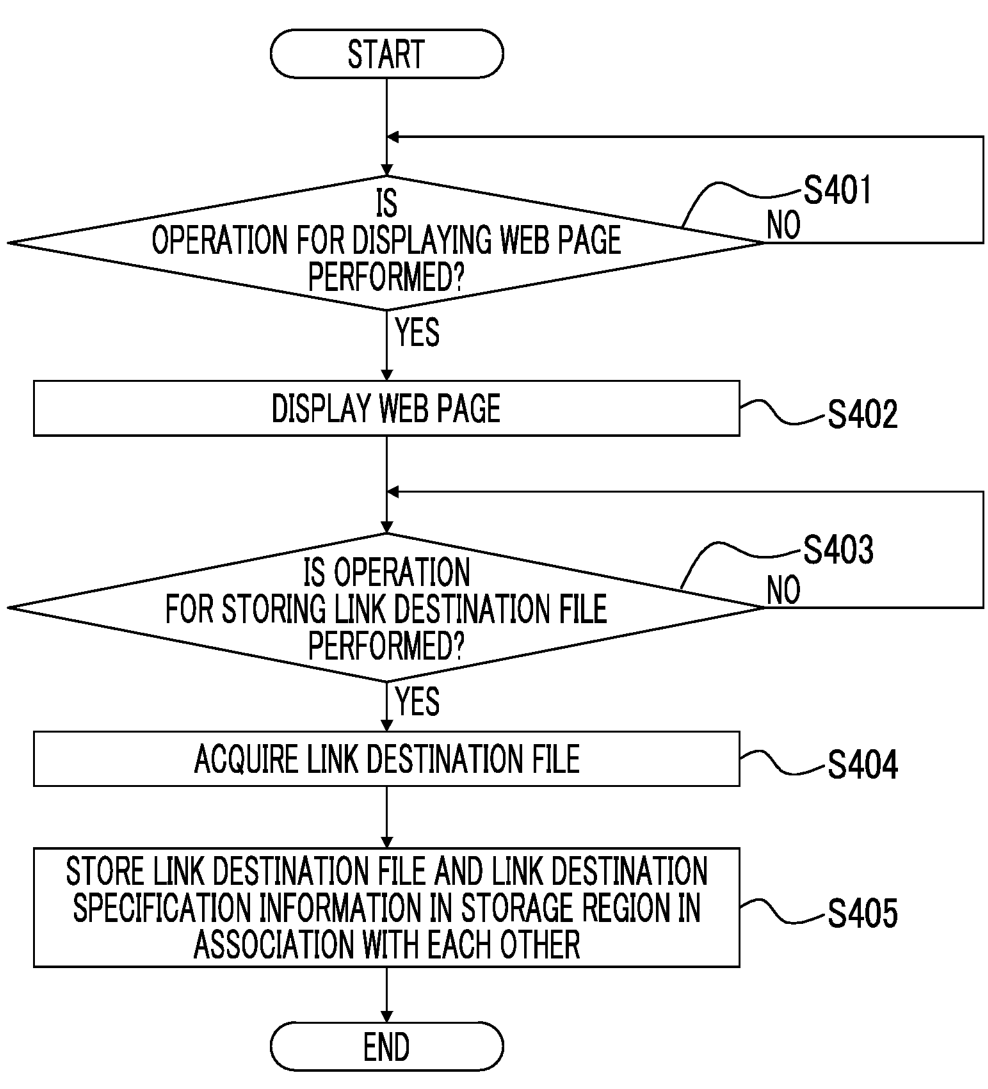
FIG. 4 is a flowchart illustrating an example of a flow of processing of storing a link destination file in a storage region in processing of the user terminal.

FIG. 4 is a flowchart illustrating an example of a flow of processing of storing the link destination file in the storage region in processing of the user terminal 10.

In a case where an operation for displaying the web page including the link object is performed (YES in step S401), the user terminal 10 accesses the web page and displays the web page (step S402). On the other hand, in a case where the operation for displaying the web page is not performed (NO in step S401), the user terminal 10 repeats step S401 until the operation for displaying the web page is performed.

In a case where the operation for storing the link destination file is performed as the predetermined operation with respect to the link object displayed on the web page of the access destination (YES in step S403), the user terminal 10 accesses the provider of the link destination file and acquires the link destination file (step S404). The user terminal 10 stores the acquired link destination file and the link destination specification information in the storage region in association with each other (step S405). Specifically, the user terminal 10 stores the acquired link destination file and the link destination specification information in the storage region in association with each other by uploading to the cloud storage 30. On the other hand, in a case where the operation for storing the link destination file is not performed (NO in step S403), the user terminal 10 repeats step S403 until the operation for storing the link destination file is performed.

Figure 5:
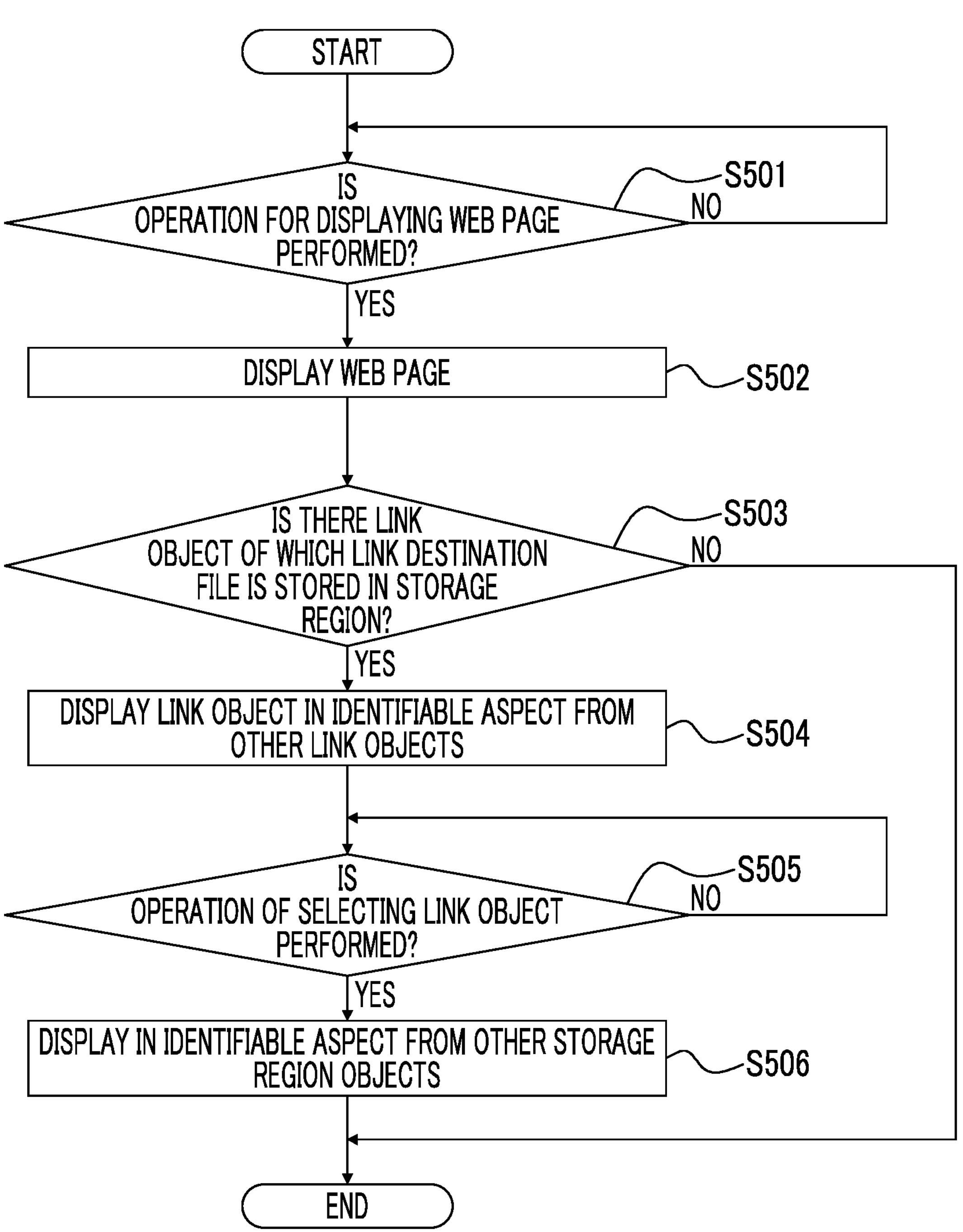
FIG. 5 is a flowchart illustrating an example of a flow of processing of displaying a web page including a link object of which the link destination file is stored in the storage region in the processing of the user terminal.

FIG. 5 is a flowchart illustrating an example of a flow of processing of displaying the web page including the link object of which the link destination file is stored in the storage region in the processing of the user terminal 10. FIG. 5 illustrates an example of the flow of processing in a case where the display aspect is identifiable without superimposing various types of information on the storage region object. The flow of processing in a case of superimposing various types of information on the storage region object will be described later with reference to FIG. 6.

In a case where the operation for displaying the web page including the link object is performed (YES in step S501), the user terminal 10 accesses the web page and displays the web page (step S502). On the other hand, in a case where the operation for displaying the web page is not performed (NO in step S501), the user terminal 10 repeats step S501 until the operation for displaying the web page is performed.

Next, in a case where there is a link object of which the link destination file is stored in the storage region among the link objects displayed on the web page of the access destination (YES in step S503), the user terminal 10 displays the link object in the identifiable aspect from other link objects (step S504) and transitions to processing of step S505. On the other hand, in a case where there is no link object of which the link destination file is stored in the storage region among the link objects displayed on the web page (NO in step S503), the user terminal 10 ends the processing (END).

In a case where the operation of selecting the link object displayed in the identifiable aspect from other link objects from among the link objects displayed on the web page is performed (YES in step S505), the user terminal 10 displays the storage region object associated with the storage region in which the link destination file is stored, in the identifiable aspect from other storage region objects (step S506). On the other hand, in a case where the operation of selecting the link object displayed in the identifiable aspect from other link objects is not performed (NO in step S505), the user terminal 10 repeats the processing of step S505 until the operation of selecting the link object displayed in the identifiable aspect from other link objects is performed.

Figure 6:
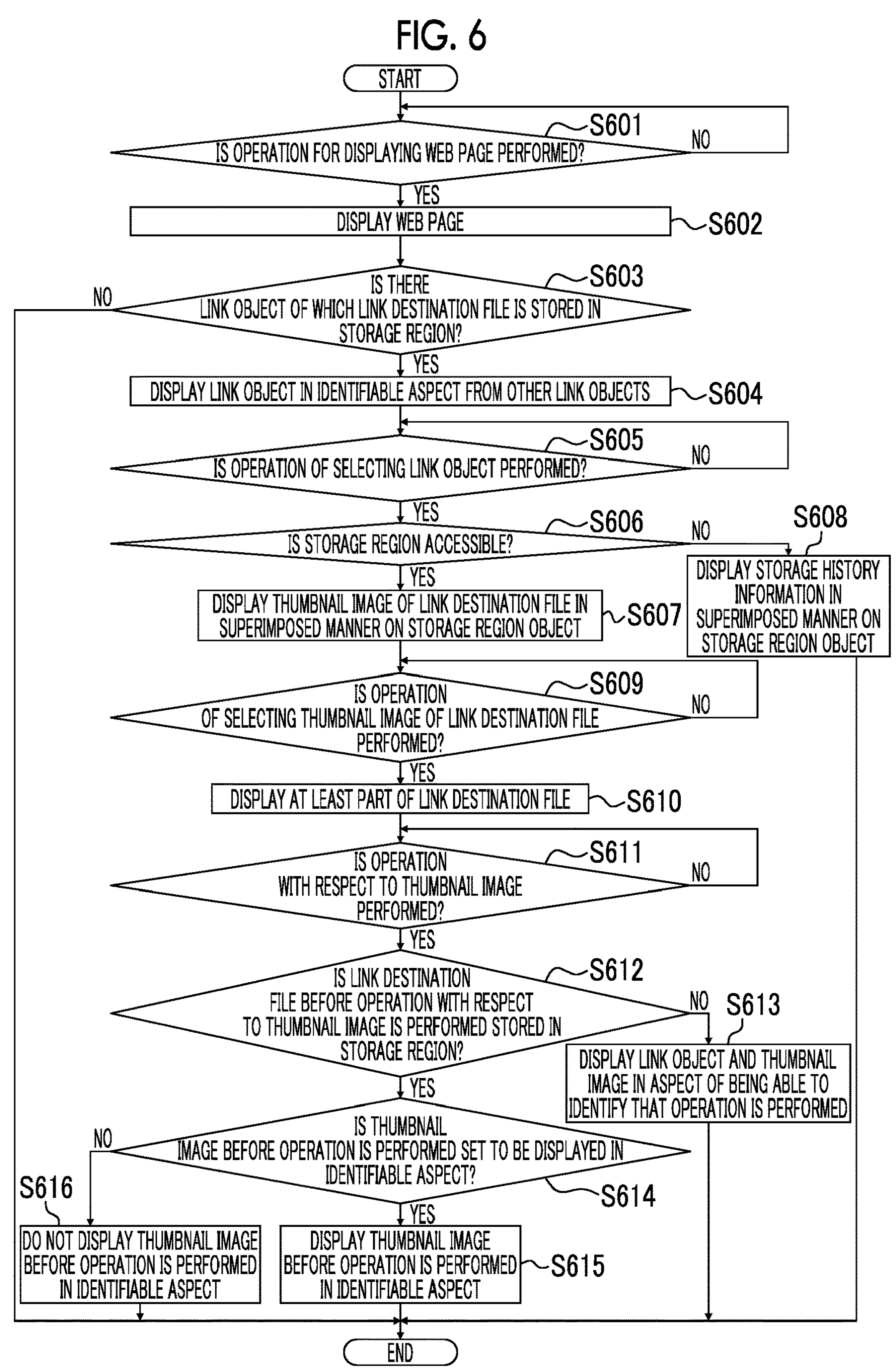
FIG. 6 is a flowchart illustrating an example of the flow of processing of displaying the web page including the link object of which the link destination file is stored in the storage region in the processing of the user terminal.

FIG. 6 is a flowchart illustrating an example of the flow of processing of displaying the web page including the link object of which the link destination file is stored in the storage region in the processing of the user terminal 10. FIG. 6 illustrates an example of the flow of processing in a case of superimposing various types of information on the storage region object. In addition, in the flow of processing illustrated in FIG. 6, processing of steps S601 to S604 is the same as the processing of steps S501 to S504 in FIG. 5 and will not be described.

In a case where the operation of selecting the link object displayed in the identifiable aspect from other link objects from among the link objects displayed on the web page is performed (YES in step S605), the user terminal 10 transitions to processing of step S606. On the other hand, in a case where the operation of selecting the link object displayed in the identifiable aspect from other link objects is not performed (NO in step S605), the user terminal 10 repeats the processing of step S605 until the operation of selecting the link object displayed in the identifiable aspect from other link objects is performed.

In a case where the storage region in which the link destination file is stored is accessible (YES in step S606), the user terminal 10 displays the thumbnail image of the link destination file in a superimposed manner on the storage region object associated with the storage region in which the link destination file is stored (step S607) and transitions to processing of step S609. On the other hand, in a case where the storage region in which the link destination file is stored is not accessible (NO in step S606), the user terminal 10 displays the storage history information in a superimposed manner on the storage region object associated with the storage region in which the link destination file is stored (step S608).

In a case where an operation of selecting the thumbnail image of the link destination file displayed in a superimposed manner on the storage region object is performed (YES in step S609), the user terminal 10 displays at least a part of the link destination file (step S610) and transitions to processing of step S611. On the other hand, in a case where the operation of selecting the thumbnail image of the link destination file is not performed (NO in step S609), the user terminal 10 repeats step S609 until the operation of selecting the thumbnail image of the link destination file is performed.

In a case where an operation with respect to the selected thumbnail image is performed (YES in step S611), the user terminal 10 transitions to processing of step S612. Here, the "operation" is, for example, the operation of combining the plurality of link destination files. On the other hand, in a case where the operation with respect to the selected thumbnail image is not performed (NO in step S611), the user terminal 10 repeats the processing of step S611 until the operation with respect to the selected thumbnail image is performed.

In a case where the link destination file before the operation with respect to the thumbnail image is performed is stored in the storage region (YES in step S612), the user terminal 10 transitions to processing of step S614. Here, a case where the link destination file before the operation with respect to the thumbnail image is performed is stored in the storage region means, for example, in a case where the operation of combining the plurality of link destination files stored in the storage region is performed, keeping each of the plurality of link destination files before the combining in the storage region and newly creating the link destination file after the combining in the storage region. On the other hand, in a case where the link destination file before the operation with respect to the thumbnail image is performed is not stored in the storage region (NO in step S612), the user terminal 10 displays the link object and the thumbnail image in the aspect of being able to identify that the operation is performed (step S613).

In a case where the thumbnail image before the operation is performed is set to be displayed in the identifiable aspect (YES in step S614), the user terminal 10 displays the thumbnail image before the operation is performed in the identifiable aspect (step S615). On the other hand, in a case where the thumbnail image before the operation is performed is set to be not displayed in the identifiable aspect (NO in step S614), the user terminal 10 does not display the thumbnail image before the operation is performed in the identifiable aspect (step S616).

SPECIFIC EXAMPLE

Specific Example 1 of Website

Figure 7:
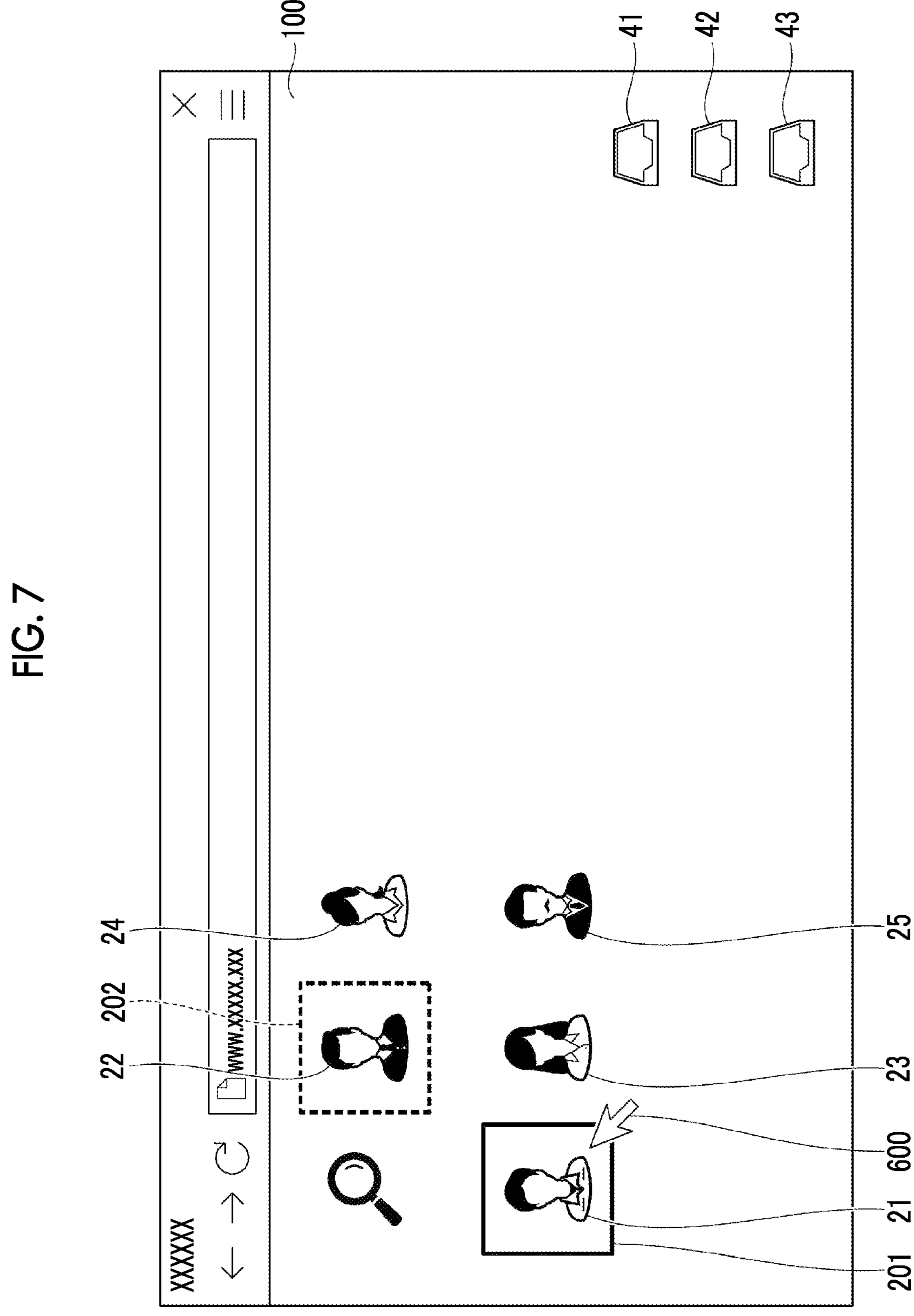
FIG. 7 is a diagram illustrating a specific example of a website displayed on the user terminal.
Figure 8:
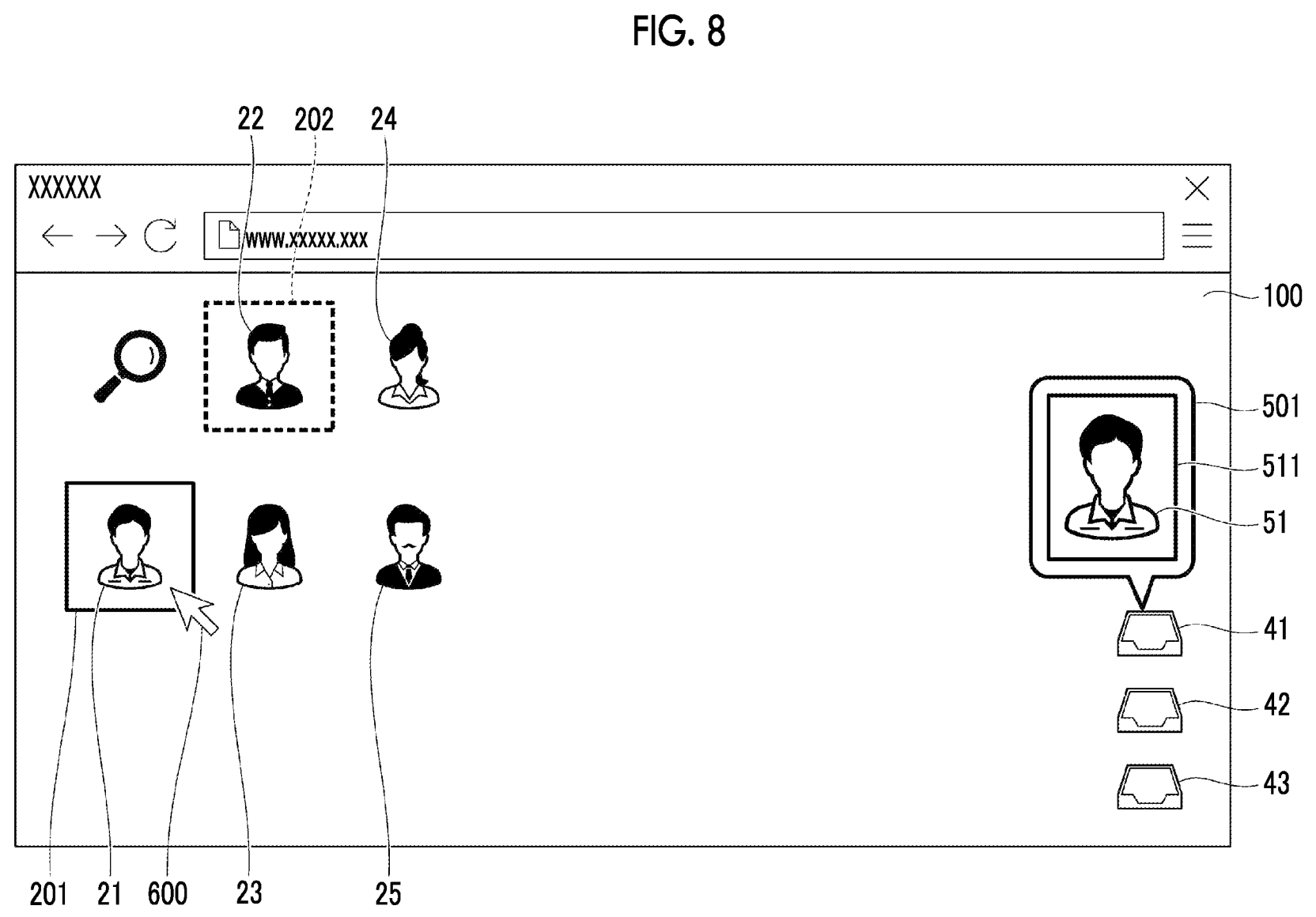

FIGS. 7 and 8 are diagrams illustrating specific examples of a website displayed on the user terminal 10.

Link objects 21 to 25 of images are displayed on a web page 100 illustrated in FIGS. 7 and 8. In addition, on the web page 100, storage region objects 41 to 43 associated with the storage regions of the cloud storage 30 are displayed in a superimposed manner on the web page 100.

Here, in the specific examples illustrated in FIGS. 7 and 8, the link destination files of the link objects 21 and 22 are stored in the storage regions associated with the storage region objects 41 and 42, respectively. On the other hand, an assumption that the link destination file of each of the link objects 23 to 25 is not stored in the storage regions is made. In addition, an assumption that the user has permission to access the storage region associated with each of the storage region objects 41 to 43 is made.

As described above, the user terminal 10 displays the link object of which the link destination file is stored in the storage region among the link objects displayed on the web page of the access destination, in the identifiable aspect from other link objects. For example, in FIG. 7, the link objects 21 and 22 of which the link destination files are stored in the storage regions are displayed in the identifiable aspect from the other link objects 23 to 25 of which the link destination files are not stored in the storage regions. Specifically, the link object 21 is displayed in a highlighted manner with a frame 201 of a solid line, and the link object 22 is displayed in a highlighted manner with a frame 202 of a broken line.

In addition, as described above, in a case where the operation of selecting the link object of which the link destination file is stored in the storage region is performed, the user terminal 10 displays the storage region object of the storage region in which the link destination file is stored, in the identifiable aspect from other storage region objects. For example, in FIG. 8, an operation (so-called mouse-over operation) of superimposing a cursor 600 on a display region of the link object 21 is performed as an operation of selecting the link object 21. Accordingly, the storage region object 41 of the storage region in which the link destination file of the link object 21 is stored is displayed in the identifiable aspect from the other storage region objects 42 and 43. Specifically, as the identifiable aspect, a bubble image 501 including a thumbnail image 51 of the link destination file is displayed near the storage region object 41.

In addition, while illustration is not provided, in a case where the operation of superimposing the cursor 600 on a display region of the link object 22 is performed, the storage region object 42 of the storage region in which the link destination file of the link object 22 is stored is also displayed in the identifiable aspect from the other storage region objects 41 and 43.

Specific Example 2 of Website

Figure 9:
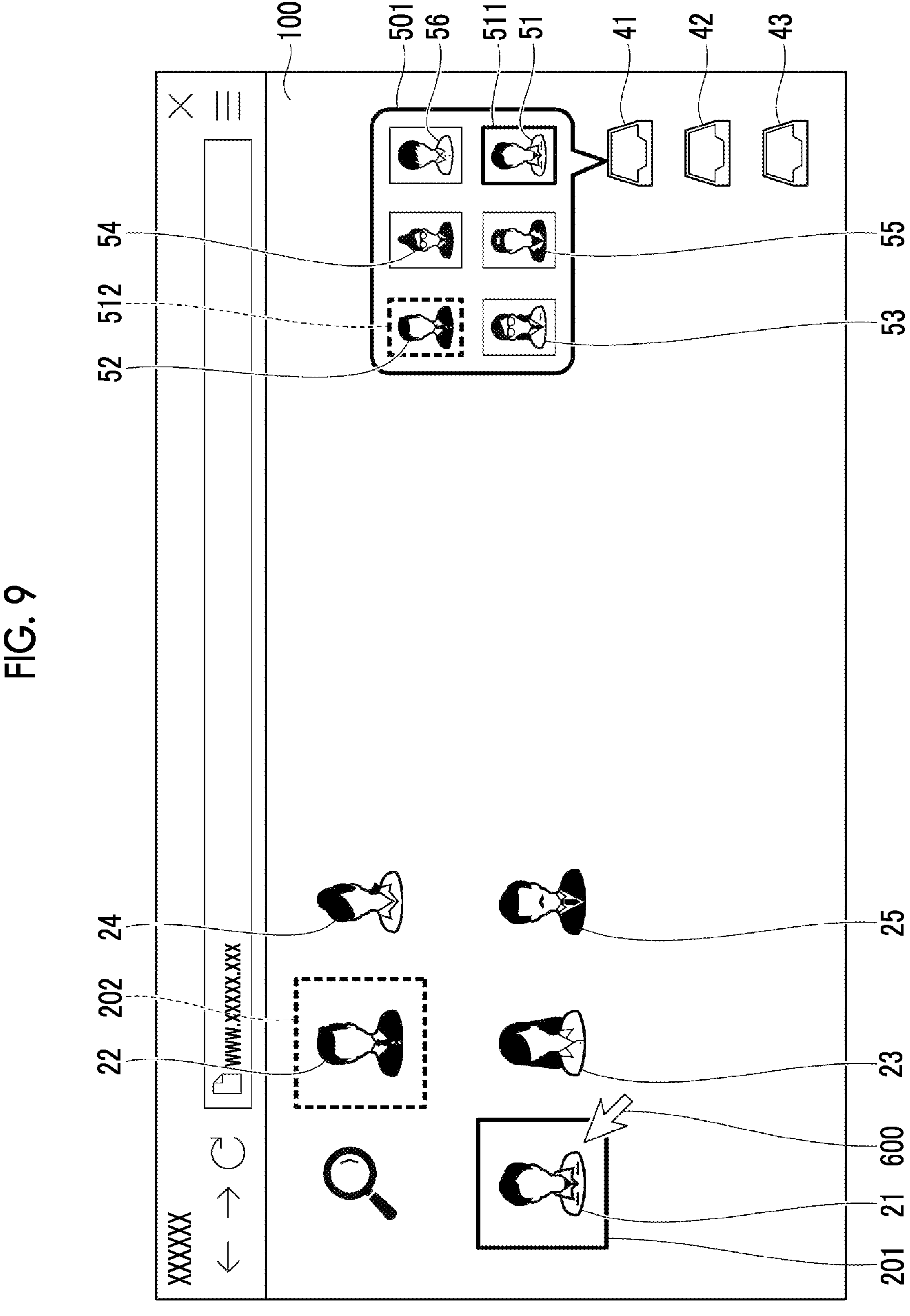
FIG. 9 is a diagram illustrating a specific example of the website displayed on the user terminal different from the examples in FIGS. 7 and 8.
Figure 10:
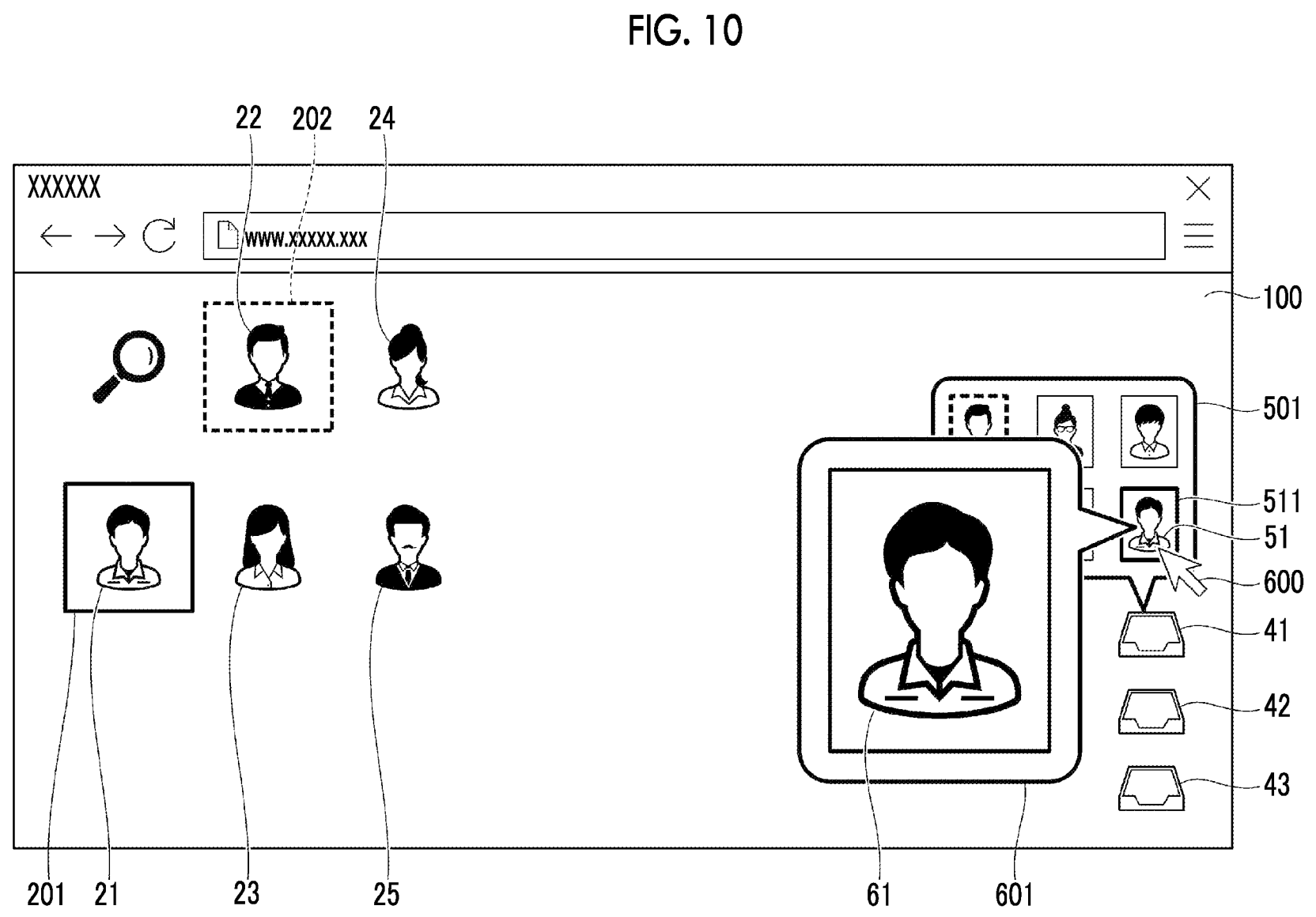

FIGS. 9 and 10 are diagrams illustrating specific examples of the website displayed on the user terminal 10 different from the examples in FIGS. 7 and 8. In the same manner as FIGS. 7 and 8, the link objects 21 to 25 of the images are displayed on the web page 100 illustrated in FIGS. 9 and 10. In addition, on the web page 100, the storage region objects 41 to 43 associated with the storage regions of the cloud storage 30 are displayed in a superimposed manner on the web page 100.

Here, in the specific examples illustrated in FIGS. 9 and 10, an assumption that the link destination file of each of the link objects 21 and 22 is stored in the storage region associated with the storage region object 41 and that the link destination files of the other link objects 23 to 25 are not stored in the storage regions is made. That is, while the link destination files of the link objects 21 and 22 are stored in different storage regions in the examples illustrated in FIGS.

7 and 8, the link destination file of each of the link objects 21 and 22 is assumed to be stored in the same storage region in the examples illustrated in FIGS. 9 and 10. In addition, an assumption that the user has permission to access the storage region associated with each of the storage region objects 41 to 43 is made.

In the example in FIG. 9, since the link destination file of each of the link objects 21 and 22 is stored in the same storage region, the storage region object 41 of the storage region in which the link destination files of the link objects 21 and 22 are stored is displayed in the identifiable aspect from the other storage region objects 42 and 43. Specifically, as the identifiable aspect, the bubble image 501 including thumbnail images 51 and 52 of the link destination files and thumbnail images 53 to 56 of all other files stored in the storage region of the storage region object 41 is displayed near the storage region object 41. Furthermore, the thumbnail images 51 and 52 are displayed in a highlighted manner with a frame 511 of a solid line and a frame 512 of a broken line, respectively, as the identifiable aspect from other thumbnail images.

In addition, while illustration is not provided, even in a case where the operation of superimposing the cursor 600 on the display region of the link object 22 is performed, the bubble image 501 including the thumbnail images 51 and 52 of the link destination files is also displayed in a superimposed manner on the storage region object 41. While an example in which the bubble image 501 including the thumbnail images 51 to 56 of all files stored in the storage region of the storage region object 41 is displayed near the storage region object 41 is illustrated in FIG. 9, the present invention is not limited thereto. For example, the bubble image 501 including only the thumbnail images 51 and 52 associated with the link destination files of the link objects 21 and 22 displayed on the web page 100 may be displayed near the storage region object 41.

In a case where an operation of selecting one thumbnail image from among the thumbnail images 51 to 56 included in the bubble image 501 in FIG. 9 is performed, the user terminal 10 displays at least a part of the link destination file associated with the thumbnail image in an enlarged manner. For example, in the example in FIG. 10, an operation (so-called mouse-over operation) of superimposing the cursor 600 on a display region of the thumbnail image 51 is performed as the operation of selecting the thumbnail image 51. Accordingly, at least a part of a link destination file 61 associated with the thumbnail image 51 is displayed in an enlarged manner. Specifically, a bubble image 601 including at least a part of the link destination file 61 is displayed in a superimposed manner on the bubble image 501. While illustration is not provided, in a case where the operation of selecting the link object 21 is performed, the bubble image 601 including the link destination file 61 of the link object 21 may be displayed in a superimposed manner on the storage region object 41.

Specific Example 3 of Website

Figure 11:
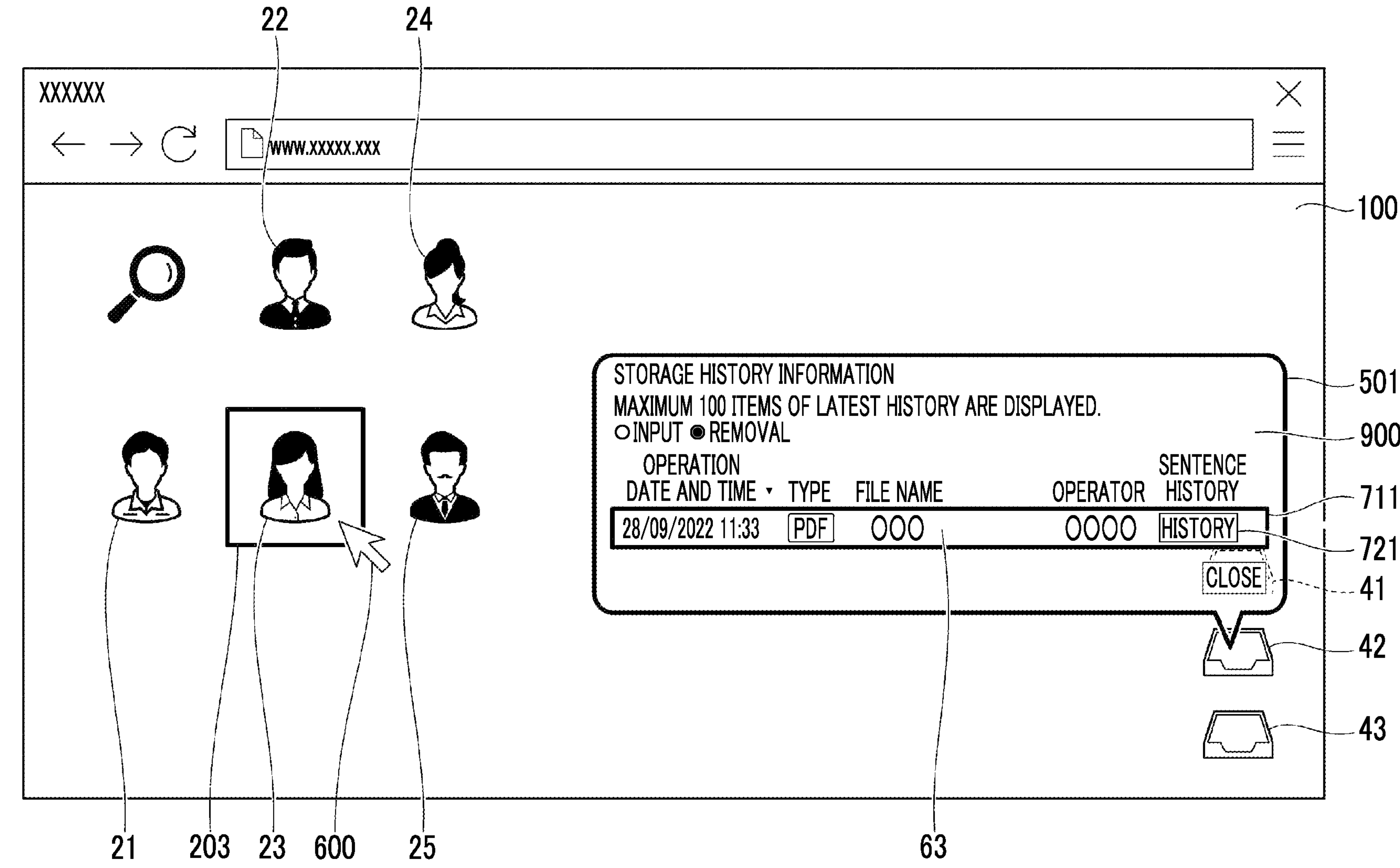
FIG. 11 is a diagram illustrating a specific example of the website displayed on the user terminal different from the examples in FIG. 7 to FIG. 10.

FIG. 11 is a diagram illustrating a specific example of the website displayed on the user terminal 10 different from the examples in FIG. 7 to FIG. 10.

In the same manner as FIG. 7 to FIG. 10, the link objects 21 to 25 of the images are displayed on the web page 100 illustrated in FIG. 11. In addition, on the web page 100, the storage region objects 41 to 43 associated with the storage regions of the cloud storage 30 are displayed in a superimposed manner on the web page 100.

Here, while a link destination file 63 of the link object 23 is stored in the storage region associated with the storage region object 42 in the specific example illustrated in FIG. 11, an assumption that the user is not granted permission to access the storage region is made. In addition, an assumption that the link destination files of the link objects 21, 22, 24, and 25 other than the link object 23 are not stored in the storage regions is made.

As described above, in a case where the user who does not have permission to access the storage region in which the link destination file is stored performs the operation of selecting the link object associated with the link destination file, the user terminal 10 displays the link object in the identifiable aspect from other link objects and displays the storage history information in a superimposed manner on the storage region object associated with the storage region. Here, “displaying in a superimposed manner” does not necessarily means a case of visually displaying the storage history information in a superimposed manner on the storage region object and includes a case of displaying the storage history information in an aspect in which a correspondence relationship between the storage history information and the storage region is perceived.

In the example in FIG. 11, since an operation of selecting the link object 23 associated with the link destination file 63 is performed, the link object 23 is displayed in the identifiable aspect from the other link objects 21, 22, 24, and 25. Specifically, the link object 23 is displayed in a highlighted manner with a frame 203 of a solid line.

In addition, since the user is not granted permission to access the storage region associated with the storage region object 42, in a case where an operation (so-called mouse-over operation) of superimposing the cursor 600 on a display region of the link object 23 is performed as illustrated in FIG. 11, the bubble image 501 including storage history information 900 is displayed in a superimposed manner on the storage region object 42 of the storage region in which the link destination file 63 of the link object 23 is stored.

The storage history information 900 is displayed in a switchable aspect between “input” indicating a history of upload to the storage region and “removal” indicating a history of movement or deletion from the storage region. Information related to a history of operation with respect to the link destination file 63 is displayed on the storage history information 900 in FIG. 11. Specifically, an operation date and time with respect to the link destination file 63, a type and a file name of the link destination file 63, and information with which an operator can be specified are included. In addition, while illustration is not provided, in a case where a button 721 marked with “history” is pressed, information related to a further detailed history is displayed.

Here, on the storage history information 900 illustrated in FIG. 11, information about the link destination file 63 is displayed and furthermore, is displayed in a highlighted manner with a frame 711 of a solid line. This indicates that the link destination file of the selected link object 23 is the link destination file 63.

Specific Example 4 of Website

Figure 12:
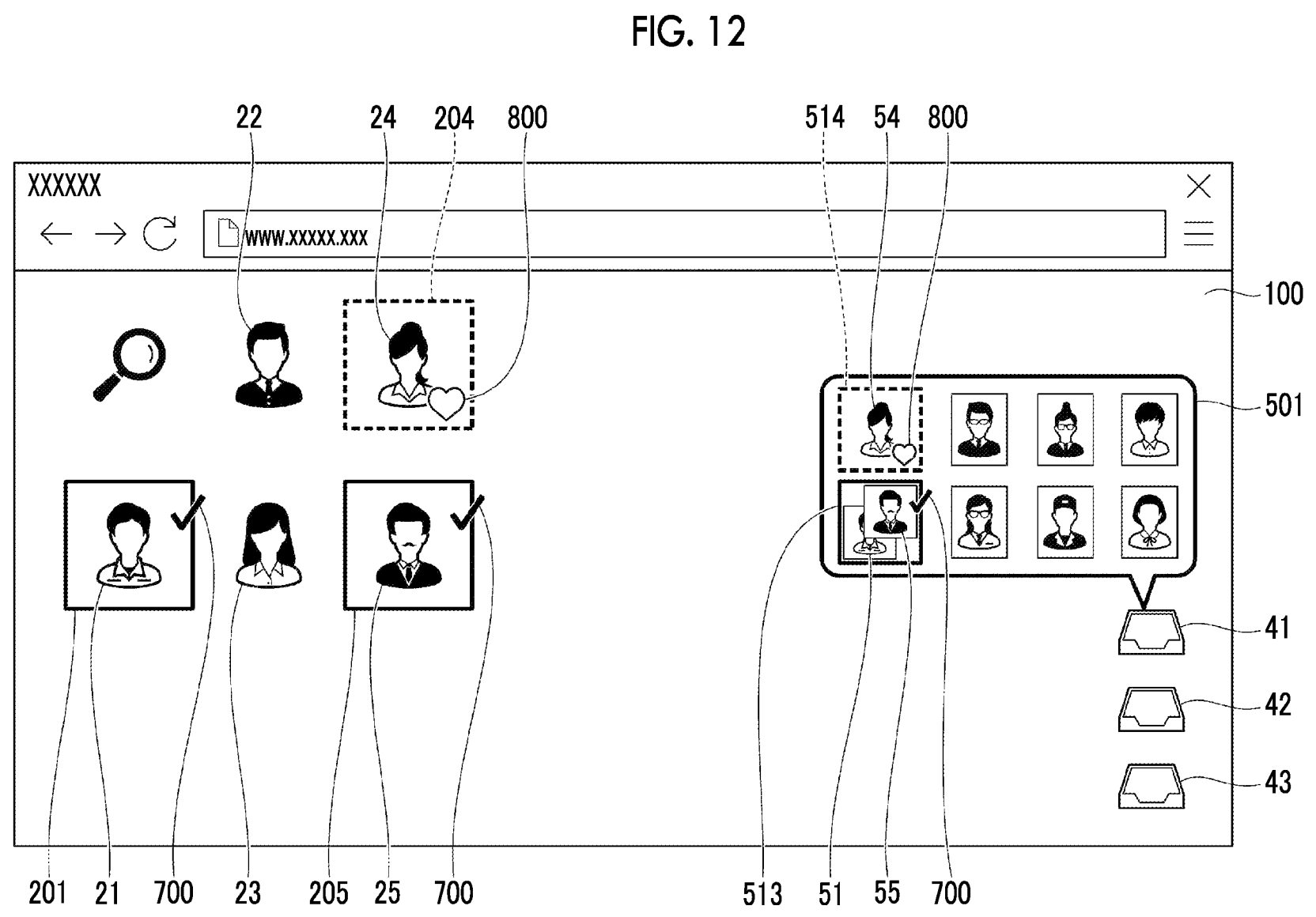

FIG. 12 is a diagram illustrating a specific example of the website displayed on the user terminal 10 different from the examples in FIG. 7 to FIG. 11.

In the same manner as FIG. 7 to FIG. 11, the link objects 21 to 25 of the images are displayed on the web page 100 illustrated in FIG. 12. In addition, on the web page 100, the storage region objects 41 to 43 associated with the storage regions of the cloud storage 30 are displayed in a superimposed manner on the web page 100.

Here, in the specific example illustrated in FIG. 12, an assumption that the link destination file of each of the link objects 21, 24, and 25 is stored in the storage region associated with the storage region object 41 is made. That is, in the example illustrated in FIG. 12, an assumption that the link destination file of each of the link objects 21, 24, and 25 is stored in the same storage region is made.

In addition, an assumption that the combining operation is performed on the thumbnail image of the link destination file of the link object 21 and on the thumbnail image of the link destination file of the link object 25 and that an operation of attaching a tag is performed on the thumbnail image of the link destination file of the link object 24 is made. In addition, an assumption that the link destination files of the link objects 22 and 23 are not stored in the storage regions is made. An assumption that the user has permission to access the storage region associated with each of the storage region objects 41 to 43 is made.

In the example in FIG. 12, since the link destination file of each of the link objects 21, 24, and 25 is stored in the same storage region, the storage region object 41 of the storage region in which the link destination file of the link objects 21, 24, and 25 is stored is displayed in the identifiable aspect from the other storage region objects 42 and 43. Specifically, as the identifiable aspect, the bubble image 501 including the thumbnail images 51, 54, and 55 of the link destination files and the thumbnail image of each of all other files stored in the storage region of the storage region object 41 is displayed near the storage region object 41.

Here, the link objects 21 and 25 are displayed in a highlighted manner with frames 201 and 205 of a solid line, respectively, as the identifiable aspect from other link objects. In addition, since the link destination file of the link object 21 is combined with the link destination file of the link object 25, the link objects 21 and 25 are displayed in an aspect indicating the combining. Specifically, as illustrated in FIG. 12, display is performed in an aspect in which an image 700 showing a check mark is attached to each of the link objects 21 and 25.

In addition, the thumbnail image 51 of the link destination file of the link object 21 and the thumbnail image 55 of the link destination file of the link object 25 are also displayed in the aspect indicating the combining. Specifically, as illustrated in FIG. 12, display is performed in an aspect in which the thumbnail image 51 is superimposed on the thumbnail image 55 and in which the image 700 showing the check mark is attached. Furthermore, the thumbnail images 51 and 55 are displayed in a highlighted manner with a frame 513 of a solid line as the identifiable aspect from other thumbnail images.

In addition, the link object 24 is displayed in a highlighted manner with a frame 204 of a broken line as the identifiable aspect from other thumbnail images. Furthermore, since the tag is attached to the link destination file of the link object 24, a tag 800 is attached to the link object 24. In addition, the thumbnail image 54 of the link destination file of the link object 24 is displayed in a highlighted manner with a frame 514 of a broken line as the identifiable aspect from other thumbnail images. Furthermore, the tag 800 is attached to the thumbnail image 54.

Specific Example 5 of Website

Figure 13:
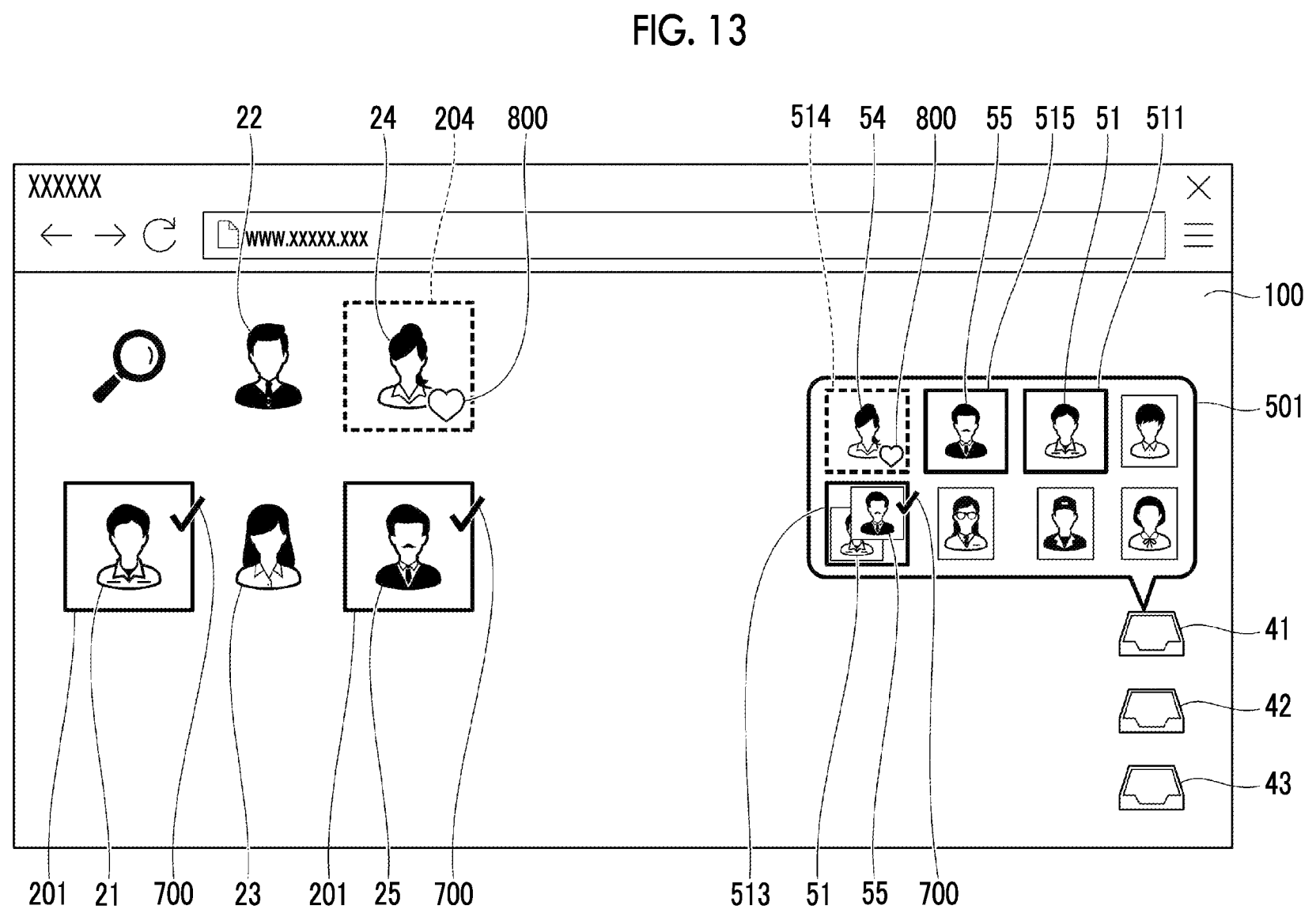
Figure 14:
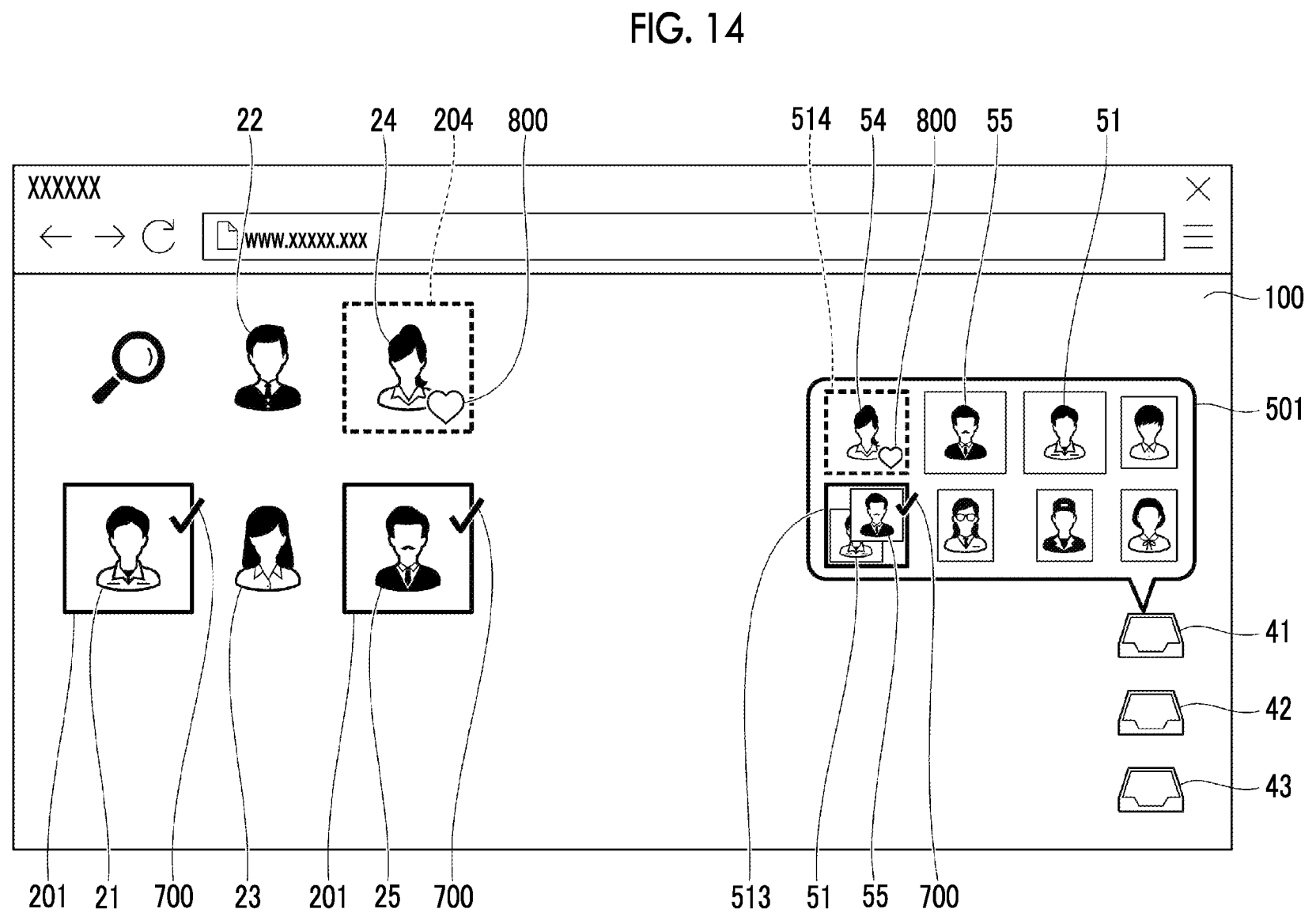

FIGS. 13 and 14 are diagrams illustrating specific examples of the website displayed on the user terminal 10 different from the examples in FIG. 7 to FIG. 12. In the same manner as FIG. 7 to FIG. 12, the link objects 21 to 25 of the images are displayed on the web page 100 illustrated in FIGS. 13 and 14. In addition, on the web page 100, the storage region objects 41 to 43 associated with the storage regions of the cloud storage 30 are displayed in a superimposed manner on the web page 100.

The specific examples illustrated in FIGS. 13 and 14 are basically the same as the specific example in FIG. 12 except for the following differences. That is, while the link destination file before the operation with respect to the thumbnail image is performed is not stored in the storage region in the specific example illustrated in FIG. 12, the link destination file before the combining operation is performed is stored in the storage region in the specific examples illustrated in FIGS. 13 and 14.

In addition, in the specific example illustrated in FIG. 14, an assumption that the thumbnail images 51 and 55 of the link destination files before the combining operation is performed are set in advance to be not displayed in the identifiable aspect from other thumbnail images is made. In this case, as illustrated in FIG. 14, each of the thumbnail images 51 and 55 of the link destination files before the operation with respect to the thumbnail image is performed is displayed in the bubble image 501, which is different from the example in FIG. 12, and is not displayed in the identifiable aspect from other thumbnail images, which is different from the example in FIG. 13.

Specific Example 6 of Website

Figure 15:
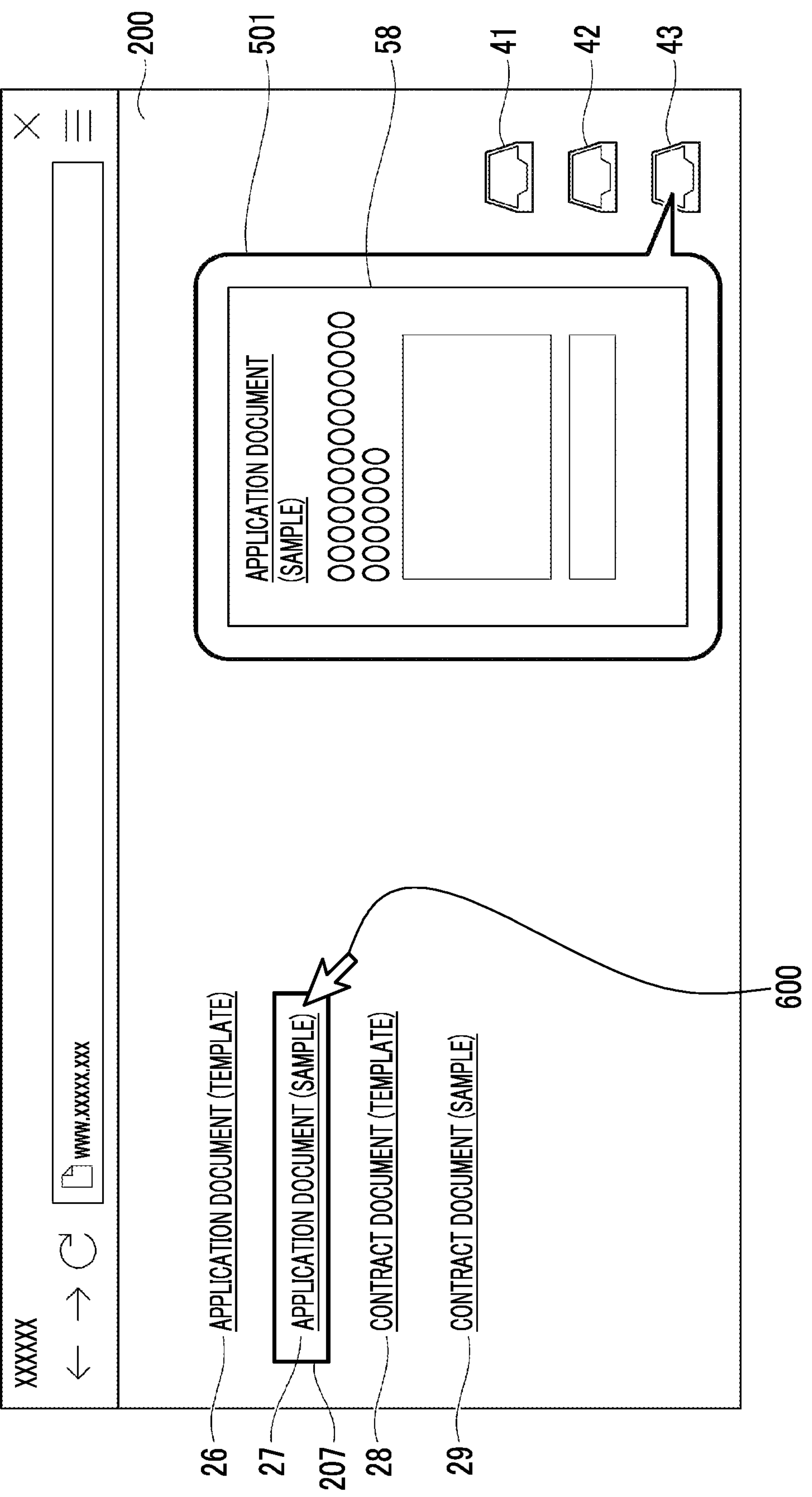
FIG. 15 is a diagram illustrating a specific example of the website displayed on the user terminal different from the examples in FIG. 7 to FIG. 14.

FIG. 15 is a diagram illustrating a specific example of the website displayed on the user terminal 10 different from the examples in FIG. 7 to FIG. 14.

Unlike FIG. 7 to FIG. 14, link objects 26 to 29 of texts are displayed on a web page 200 illustrated in FIG. 15. In addition, on the web page 200, the storage region objects 41 to 43 associated with the storage regions of the cloud storage 30 are displayed in a superimposed manner on the web page 200.

Here, in the specific example illustrated in FIG. 15, the link destination file of the link object 27 marked with "application document (sample)" is stored in the storage region associated with the storage region object 43. On the other hand, an assumption that the link destination file of each of the link objects 26, 28, and 29 is not stored in the storage regions is made. In addition, an assumption that the user has permission to access the storage region associated with each of the storage region objects 41 to 43 is made.

As described above, the user terminal 10 displays the link object of which the link destination file is stored in the storage region among the link objects displayed on the web page of the access destination, in the identifiable aspect from other link objects. For example, in FIG. 15, the link object 27 of which the link destination file is stored in the storage region is displayed in the identifiable aspect from the other link objects 26, 28, and 29 of which the link destination files are not stored in the storage regions. Specifically, the link object 27 is displayed in a highlighted manner with a frame 207 of a solid line.

In addition, as described above, in a case where the operation of selecting the link object of which the link destination file is stored in the storage region is performed, the user terminal 10 displays the storage region object of the storage region in which the link destination file is stored, in the identifiable aspect from other storage region objects. For example, in FIG. 15, an operation (so-called mouse-over operation) of superimposing the cursor 600 on a display region of the link object 27 is performed as an operation of selecting the link object 27. Accordingly, the storage region object 43 of the storage region in which the link destination file of the link object 27 is stored is displayed in the identifiable aspect from the other storage region objects 41 and 42. Specifically, as the identifiable aspect, the bubble image 501 including a thumbnail image 58 of the link destination file is displayed in a superimposed manner on the storage region object 43.

Here, in a case where a predetermined operation (for example, a double-click operation) is performed on the thumbnail image 58 of the link destination file included in the bubble image 501, the link destination file is opened.

Specific Example 7 of Website

FIG. 16 is a diagram illustrating a specific example of the website displayed on the user terminal 10 different from the examples in FIG. 7 to FIG. 15.

In the same manner as FIG. 15, the link objects 26 to 29 of the texts are displayed on the web page 200 illustrated in FIG. 16. However, the link objects 26, 28, and 29 illustrated in FIG. 16 are provided with checkboxes 71 to 73, respectively, which is different from FIG. 15. Here, the link object provided with the checkbox indicates the link object of which the link destination file is not stored in the storage region. On the other hand, the link object not provided with the checkbox indicates the link object of which the link destination file is stored in the storage region. The checkbox is an operation tool displayed by operating a program according to an exemplary embodiment of the present invention at the time of viewing the web page. An assumption that the user has permission to access the storage region associated with each of the storage region objects 41 to 43 is made.

In the example in FIG. 16, since the link objects 26, 28, and 29 are provided with the checkboxes 71 to 73, respectively, the link destination files are not stored in the storage regions. On the other hand, since the link object 27 is not provided with the checkbox, the link destination file is stored in the storage region. The user issues an instruction to download the link destination file to be stored in the storage region by performing an operation of putting a check mark in the checkbox of the link object of the link destination file. In the example in FIG. 16, since the check mark is put in the checkbox 73 of the link object 29 marked with "contract document (sample)", an instruction to download the link destination file of the link object 29 is issued.

In addition, on the web page 200, the storage region objects 41 to 43 associated with the storage regions of the cloud storage 30 are displayed in a superimposed manner on the web page 200 in the same manner as FIG. 15. However, the storage region objects 41 to 43 illustrated in FIG. 16 are provided with checkboxes 81 to 83, respectively, which is different from FIG. 15. The checkboxes 81 to 83 are operation tools for putting a check mark in designating the storage destination of the link destination file. In the example in FIG. 16, the check mark is put in the checkbox 83 of the storage region object 43. Thus, the storage region associated with the storage region object 43 is designated as the storage destination of the link destination file.

As illustrated in FIG. 16, in a case where an operation of pressing a button 801 marked with "acquire selection" is performed after an operation of putting the check mark in each of the checkbox 73 and the checkbox 83 is performed, the link destination file of the link object 29 is stored in the storage region associated with the storage region object 43. On the other hand, in a case where an operation of pressing a button 802 marked with "acquire all" is performed, the link destination files not stored in the storage regions are downloaded and stored in the storage regions regardless of whether or not the check mark is put in the checkboxes of the link objects.

Other Exemplary Embodiments

While the present exemplary embodiment has been described above, the present invention is not limited to the present exemplary embodiment. In addition, effects of the present invention are not limited to the effects disclosed in the present exemplary embodiment. For example, both of the configuration of the information processing system 1 illustrated in FIG. 1 and the hardware configuration of the user terminal 10 illustrated in FIG. 2 are merely examples for achieving the object of the present invention and are not particularly limited. In addition, the functional configuration of the user terminal 10 illustrated in FIG. 3 is merely an example and is not particularly limited. As long as the information processing system 1 in FIG. 1 is provided with a function with which the above processing can be executed as a whole, a functional configuration to be used to implement the function is not limited to the example in FIG. 3.

In addition, the order of the steps of the processing of the user terminal 10 illustrated in FIG. 4 to FIG. 6 is merely an example and is not particularly limited. Not only the processing is performed in time series along the illustrated order of the steps, but also the processing may not be performed in time series and may be parallelly or individually performed. In addition, the specific examples illustrated in FIG. 7 to FIG. 17 are merely an example and are not particularly limited.

For example, in the exemplary embodiment, in a case where the operation for storing the link destination file is received, the user terminal 10 is configured to download the link destination file to a local storage and upload the link destination file to the cloud storage 30. Thus, the link destination file uploaded to the cloud storage 30 is stored in the storage region designated among the one or more storage regions as the storage destination. However, the present invention is not limited thereto. One or more storage regions as the storage destination may be provided in the local storage, and the link destination file may be stored in the one or more storage regions.

In addition, in the exemplary embodiment, in a case where the storage region object of the storage region in which the link destination file of the link object is stored is displayed in the identifiable aspect from other storage region objects, the bubble image is configured to be displayed near the storage region object. However, the present invention is not limited to such a configuration. For example, the storage region object may be configured to be simply changed in color or displayed with a frame as the identifiable aspect from other storage region objects.

In addition, while only information related to the link destination file 63 is displayed as the storage history information 900 in the example in FIG. 11, the present invention is not limited thereto. For example, in a case where other files having the history of movement or deletion from the storage region associated with the storage region object 42 are present, information about the files may also be displayed as the storage history information 900.

In addition, while the "combining operation" in FIG. 12 is performed on the thumbnail image of each of the link objects 21 and 25, the "combining operation" may be directly performed on the link objects 21 and 25.

In addition, while the link destination file is illustrated as an example of information stored in the storage region in the exemplary embodiment, the present invention is not limited thereto. For example, as illustrated in FIG. 17, information for accessing other web pages of link destinations may be stored in the storage region.

Figure 17:
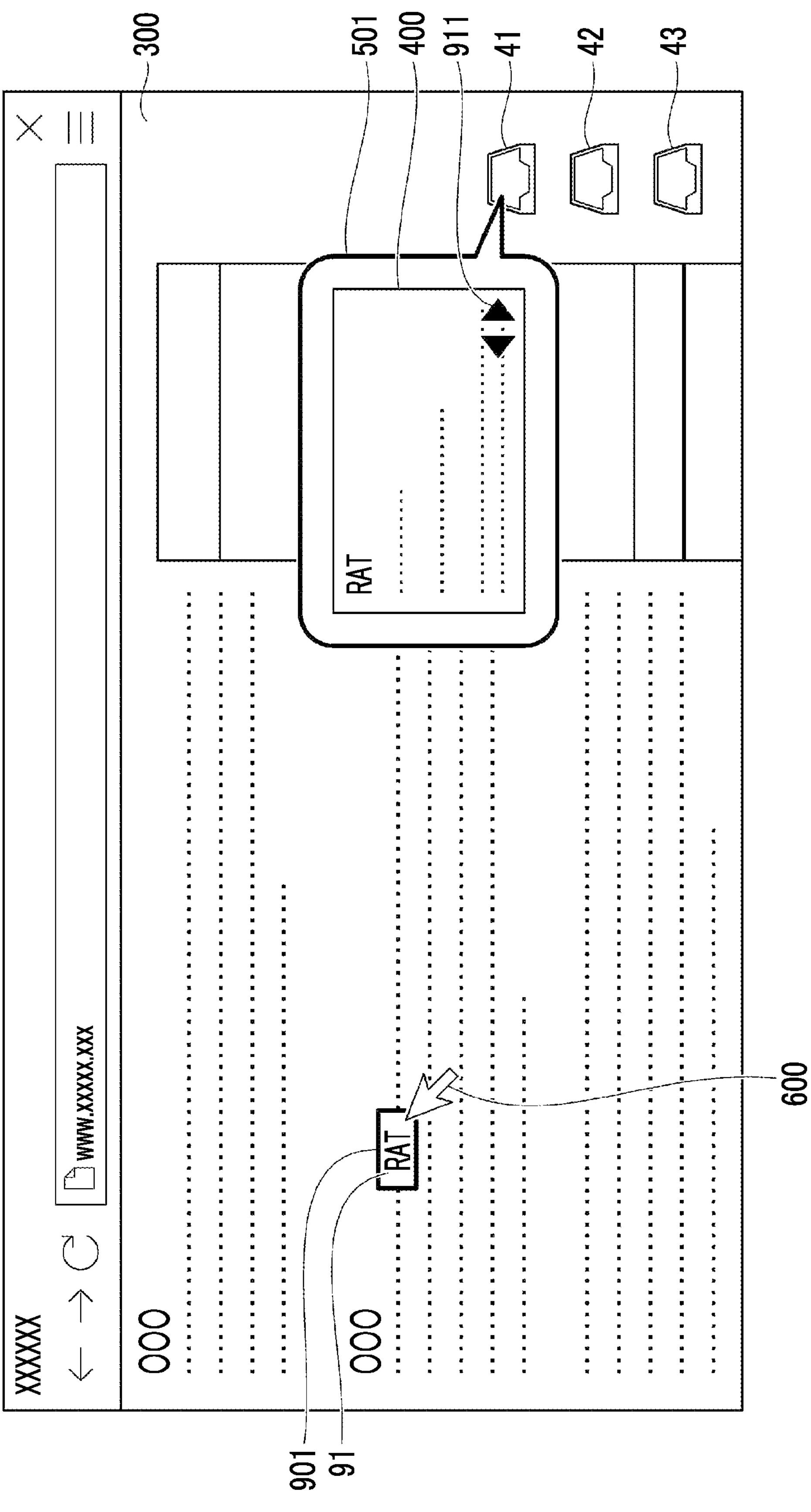
FIG. 17 is a diagram illustrating an example different from the specific examples illustrated in FIG. 7 to FIG. 16 as the website displayed on the user terminal.

FIG. 17 illustrates an example different from the specific examples illustrated in FIG. 7 to FIG. 16 as the website displayed on the user terminal 10. On a web page 300 illustrated in FIG. 17, a link object 91 associated with a URL of another web page 400 is displayed as information for accessing the other web page 400 of the link destination. The link object 91 is a text object marked with "rat" and is disposed as a part of a text sentence. Here, an assumption that the text object marked with "rat" is associated with, for example, a URL of a web page on which ecology of rats is described as the other web page 400 is made.

In addition, on the web page 300, the storage region objects 41 to 43 associated with the storage regions of the cloud storage are displayed in a superimposed manner on the web page 300. The URL of the other web page 400 that is the link destination of the link object 91 is stored in the storage region associated with the storage region object 41. An assumption that the user has permission to access the storage region associated with each of the storage region objects 41 to 43 is made.

In a case where the web page 300 includes a plurality of link objects, the link object 91 of which the URL is stored in the storage region is displayed in the identifiable aspect from other link objects. Specifically, as illustrated in FIG. 17, the link object 91 is displayed in a highlighted manner with a frame 901 of a solid line.

In a case where an operation (so-called mouse-over operation) of superimposing the cursor 600 on the link object 91 is performed as an operation of selecting the link object 91, the storage region object 41 of the storage region in which the URL of the other web page 400 is stored is displayed in the identifiable aspect from the other storage region objects 42 and 43 as illustrated in FIG. 17. Specifically, as the identifiable aspect, the bubble image 501 including a thumbnail image of the other web page 400 is displayed in a superimposed manner on the storage region object 41. Furthermore, in a case where the other web page 400 includes a plurality of pages, a button 911 with which the pages can be switched is displayed. Accordingly, the web page 300 can be viewed with reference to information about the web page on which the ecology of rats is described.

(Supplementary Note)

(((1)))

An information processing system comprising:

one or a plurality of processors configured to:

in a case where a predetermined operation is performed on a link object associated with a file present on a network, store the file and specification information for specifying the file in a predetermined storage region in association with each other; and perform a control of displaying the link object associated with the file stored in the storage region in an identifiable aspect from other link objects in a case where a plurality of objects including the link object are displayed on a web page.

(((2)))

The information processing system according to (((1))), wherein the one or the plurality of processors are configured to:

perform a control of displaying a storage region object associated with the storage region in a superimposed manner on the web page; and in a case where an operation of selecting the link object is performed, perform a control of displaying the storage region object associated with the storage region in which the file is stored, in a superimposed manner on the web page in an identifiable aspect from other storage region objects.

(((3)))

The information processing system according to (((2))), wherein the one or the plurality of processors are configured to:

in a case where the operation of selecting the link object is performed, perform a control of displaying at least a part of the file associated with the link object in a superimposed manner on the storage region object associated with the storage region in which the file is stored.

(((4)))

The information processing system according to any one of (((1))) to (((3))), wherein the file is any of an image file, a text file, or an HTML file, the link object is an image or text object indicating the file, and the specification information is information specified from source code of the web page.

(((5)))

The information processing system according to any one of (((2))) to (((4))), wherein the one or the plurality of processors are configured to:

in a case where an operation of selecting the storage region object is performed, perform a control of displaying a thumbnail image of the file stored in the storage region associated with the storage region object.

(((6)))

The information processing system according to (((5))), wherein the one or the plurality of processors are configured to:

in a case where an operation with respect to the thumbnail image of the file is performed, receive the operation as an operation with respect to the file.

(((7)))

The information processing system according to (((5))) or (((6))), wherein the one or the plurality of processors are configured to:

in a case where an operation with respect to the thumbnail image of the file is performed, perform a control of displaying the link object associated with the file on the web page in the identifiable aspect from the other link objects.

(((8)))

The information processing system according to (((6))) or (((7))), wherein the one or the plurality of processors are configured to:

in a case where an operation of combining a plurality of files stored in the storage region is performed as the operation with respect to the thumbnail image of the file, perform a control of displaying a thumbnail image indicating that the combining operation is performed, in an identifiable aspect from other thumbnail images.

(((9)))

The information processing system according to (((2))), wherein the one or the plurality of processors are configured to:

in a case where an operation of selecting the storage region object is performed, perform a control of displaying information indicating a storage history of the file in the storage region associated with the storage region object in a superimposed manner on the storage region object.

(((10)))

The information processing system according to (((9))), wherein the one or the plurality of processors are configured to:

in a case where an operation of selecting one storage history from among displayed storage histories is performed, perform a control of displaying the link object associated with the file corresponding to the one storage history on the web page in the identifiable aspect from the other link objects.

(((11)))

The information processing system according to (((9))) or (((10))), wherein the one or the plurality of processors are configured to:

in a case where the file stored in the storage region is moved to another non-accessible storage region, perform a control of displaying the information indicating the storage history in a superimposed manner on the storage region object.

(((12)))

The information processing system according to any one of (((2))) to (((11))), wherein the one or the plurality of processors are configured to:

in a case where an operation of bringing the link object into contact with or close to the storage region object is performed as the predetermined operation, store the file associated with the link object in the storage region associated with the storage region object.

(((13)))

The information processing system according to any one of (((2))) to (((12))), wherein the one or the plurality of processors are configured to:

perform a control of displaying the storage region object associated with the storage region that is a storage destination of the file, in a superimposed manner on the web page in the identifiable aspect from the other storage region objects.

(((14)))

The information processing system according to (((2))), wherein the one or the plurality of processors are configured to:

as the control of displaying the storage region object in a superimposed manner on the web page, start application software with which the storage region object is displayable in a superimposed manner on the web page.

(((15)))

The information processing system according to (((14))), wherein the one or the plurality of processors are configured to:

in a case where a predetermined operation is performed on the storage region object, perform a control of starting the application software in a display region different from a display region in which the web page is displayed, to display content of the storage region associated with the storage region object.

(((16)))

A program causing one or a plurality of computers to implement:

a function of, in a case where a predetermined operation is performed on a link object associated with a file present on a network, storing the file and specification information for specifying the file in a predetermined storage region in association with each other; and a function of displaying the link object associated with the file stored in the storage region in an identifiable aspect from other link objects in a case where a plurality of objects including the link object are displayed on a web page.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

one or a plurality of processors configured to:

display a plurality of link objects and a plurality of storage region objects on a screen;

in a case where a mouse-over or a click operation is performed on a link object of the plurality of link objects associated with a file present on a network, store the file and specification information for specifying the file in a predetermined storage region in association with each other in response to the mouse-over or the click operation;

perform a control of displaying the link object associated with the file stored in the storage region in an identifiable manner from rest of the plurality of link objects, wherein the file is associated with a storage region object of the plurality of storage region objects; and display the storage region object in an identifiable manner from rest of the plurality of storage region objects by displaying an image or a text associated with link object that identifies the storage region object.

2. The information processing system according to claim 1, wherein the one or the plurality of processors are configured to:

perform a control of displaying a storage region object of the plurality of storage region objects associated with the storage region in a superimposed manner on a web page; and in a case where the mouse-over or the click operation is performed on the link object as an operation of selecting the link object, perform a control of displaying the storage region object associated with the storage region in which the file is stored, in the superimposed manner on the web page.

3. The information processing system according to claim 2, wherein the one or the plurality of processors are configured to:

in a case where the operation of selecting the link object is performed, perform a control of displaying at least a part of the file associated with the link object in a superimposed manner on the storage region object associated with the storage region in which the file is stored.

4. The information processing system according to claim 3, wherein the file is any of an image file, a text file, or an HTML file, the link object is an image or text object indicating the file, and the specification information is information specified from source code of the web page.

5. The information processing system according to claim 2, wherein the one or the plurality of processors are configured to:

in a case where an operation of selecting the storage region object is performed, perform a control of displaying a thumbnail image of the file stored in the storage region associated with the storage region object.

6. The information processing system according to claim 5, wherein the one or the plurality of processors are configured to:

in a case where an operation with respect to the thumbnail image of the file is performed, receive the operation as an operation with respect to the file.

7. The information processing system according to claim 6, wherein the one or the plurality of processors are configured to:

in a case where an operation with respect to the thumbnail image of the file is performed, perform a control of displaying the link object associated with the file on the web page in the identifiable aspect from the other link objects.

8. The information processing system according to claim 7, wherein the one or the plurality of processors are configured to:

in a case where an operation of combining a plurality of files stored in the storage region is performed as the operation with respect to the thumbnail image of the file, perform a control of displaying a thumbnail image indicating that the combining operation is performed, in an identifiable aspect from other thumbnail images.

9. The information processing system according to claim 2, wherein the one or the plurality of processors are configured to:

in a case where an operation of selecting the storage region object is performed, perform a control of displaying information indicating a storage history of the file in the storage region associated with the storage region object in a superimposed manner on the storage region object.

10. The information processing system according to claim 9, wherein the one or the plurality of processors are configured to:

in a case where an operation of selecting one storage history from among displayed storage histories is performed, perform a control of displaying the link object associated with the file corresponding to the one storage history on the web page in the identifiable aspect from the other link objects.

11. The information processing system according to claim 10, wherein the one or the plurality of processors are configured to:

in a case where the file stored in the storage region is moved to a non-accessible storage region, perform a control of displaying the information indicating the storage history in a superimposed manner on the storage region object.

12. The information processing system according to claim 2, wherein the one or the plurality of processors are configured to:

in a case where an operation of bringing the link object into contact with or close to the storage region object is performed as the predetermined operation, store the file associated with the link object in the storage region associated with the storage region object.

13. The information processing system according to claim 12, wherein the one or the plurality of processors are configured to:

perform a control of displaying the storage region object associated with the storage region that is a storage destination of the file, in a superimposed manner on the web page in the identifiable aspect from the other storage region objects.

14. The information processing system according to claim 2, wherein the one or the plurality of processors are configured to:

as the control of displaying the storage region object in a superimposed manner on the web page, start application software with which the storage region object is displayable in a superimposed manner on the web page.

15. The information processing system according to claim 14, wherein the one or the plurality of processors are configured to:

in a case where a predetermined operation is performed on the storage region object, perform a control of starting the application software in a display region different from a display region in which the web page is displayed, to display content of the storage region associated with the storage region object.

16. A non-transitory computer readable medium storing program causing one or a plurality of computers to implement:

displaying a plurality of link objects and a plurality of storage region objects on a screen;

in a case where a mouse-over or a click operation is performed on a link object of the plurality of link objects associated with a file present on a network, storing the file and specification information for specifying the file in a predetermined storage region in association with each other in response to the mouse-over or the click operation;

performing a control of displaying the link object associated with the file stored in the storage region in an identifiable manner from rest of the plurality of link objects, wherein the file is associated with a storage region object of the plurality of storage region objects; and displaying the storage region object in an identifiable manner from rest of the plurality of storage region objects by displaying an image or a text associated with link object that identifies the storage region object.

17. An information processing method comprising:

displaying a plurality of link objects and a plurality of storage region objects on a screen;

in a case where a mouse-over or a click operation is performed on a link object of the plurality of link objects associated with a file present on a network, storing the file and specification information for specifying the file in a predetermined storage region in association with each other in response to the mouse-over or the click operation;

performing a control of displaying the link object associated with the file stored in the storage region in an identifiable manner from rest of the plurality of link objects, wherein the file is associated with a storage region object of the plurality of storage region objects; and displaying the storage region object in an identifiable manner from rest of the plurality of storage region objects by displaying an image or a text associated with link object that identifies the storage region object.

* * * * *